(12) United States Patent
Lee et al.

(10) Patent No.: US 9,851,441 B2
(45) Date of Patent: Dec. 26, 2017

(54) METHOD AND SYSTEM FOR GENERATING A DISTANCE VELOCITY AZIMUTH DISPLAY

(71) Applicants: University Corporation for Atmospheric Research, Boulder, CO (US); Department of Atmospheric Sciences, National Taiwan University, Taipei (TW)

(72) Inventors: Wen-Chau Lee, Boulder, CO (US); Jong-Dao Jou, Taipei (TW)

(73) Assignee: University Corporation for Atmospheric Research, Boulder, CO (US)

( * ) Notice: Subject to any disclaimer, the term of this patent is extended or adjusted under 35 U.S.C. 154(b) by 220 days.

(21) Appl. No.: 14/164,744

(22) Filed: Jan. 27, 2014

(65) Prior Publication Data
US 2015/0212207 A1 Jul. 30, 2015

(51) Int. Cl.
*G01S 13/95* (2006.01)
*G01P 5/00* (2006.01)
*G01S 13/18* (2006.01)
*G01S 13/58* (2006.01)

(52) U.S. Cl.
CPC .............. *G01S 13/95* (2013.01); *G01P 5/001* (2013.01); *G01S 13/18* (2013.01); *G01S 13/581* (2013.01)

(58) Field of Classification Search
CPC ...................................................... G01S 13/95
See application file for complete search history.

(56) References Cited

U.S. PATENT DOCUMENTS

| | | | | |
|---|---|---|---|---|
| 5,136,296 A | * | 8/1992 | Roettger | G01S 13/951 342/26 D |
| 6,307,500 B1 | * | 10/2001 | Cornman | G01S 13/58 342/192 |
| 6,535,158 B2 | * | 3/2003 | Wilkerson | G01P 5/001 342/104 |

(Continued)

OTHER PUBLICATIONS

K. A. Browning and R. Wexler. "The Determination of Kinematic Properties of a Wind Field Using Doppler Radar". Journal of Applied Meteorology and Climatology, Feb. 1968 vol. 7, pp. 105-113. doi: http://dx.doi.org/10.1175/1520-0450(1968)007<0105:TDOKPO>2.0.CO;2.*

(Continued)

*Primary Examiner* — Matthew M Barker
(74) *Attorney, Agent, or Firm* — The Ollila Law Group LLC

(57) ABSTRACT

A method for determining a kinematic structure of a two-dimensional wind field and a system determining the same are provided. The method comprises receiving a plurality of Doppler velocities and a plurality of distances between a Doppler radar and a gate. Each Doppler velocity of the plurality of Doppler velocities corresponds to a respective distance of the plurality of distances between the Doppler radar and the gate. The method further comprises calculating a plurality of distance Doppler velocity values. The distance Doppler velocity values represent the plurality of measured Doppler velocities and the distance between the Doppler radar and the gate. The method further comprises estimating the kinematic structure of the 2D wind field using the plurality of distance Doppler wind velocity values.

18 Claims, 13 Drawing Sheets

(56) References Cited

U.S. PATENT DOCUMENTS

| | | |
|---|---|---|
| 7,728,760 B2 | 6/2010 | Lee et al. |
| 8,077,074 B2* | 12/2011 | Venkatachalam ....... G01S 7/003 |
| | | 342/104 |
| 2013/0282285 A1* | 10/2013 | Boquet .................... G01P 5/00 |
| | | 702/3 |

OTHER PUBLICATIONS

Wen-Chau Lee, Xiaowen Tang, Ben J.-D. Jou; Distance Velocity Azimuth Display (DVAD)—New Interpretation and Analysis of Doppler Velocity (Abstract); American Meteorological Society AMS Journals Online; Online ISSN: 1520-0493; Article Oct. 18, 2013.

Wen-Chau Lee, Velocity Distance Azimuth display (VDAD) Abstract; American Meteorologist Society; 35th Conference on Radar Meteorology.

Wen-Chau Lee, Xiaowen Tang, Ben J.-D. Jou, Distance Velocity-Azimuth Display (DVAD)—New Interpretation and Analysis of Doppler Velocity, 2014 American Meteorological Society.

\* cited by examiner

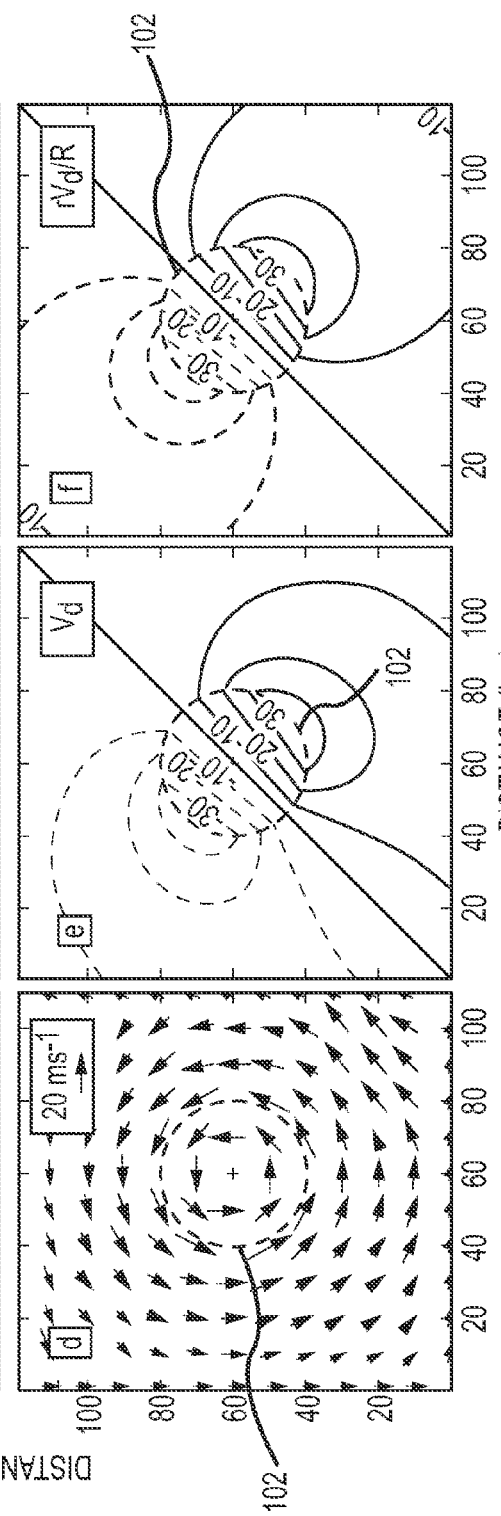

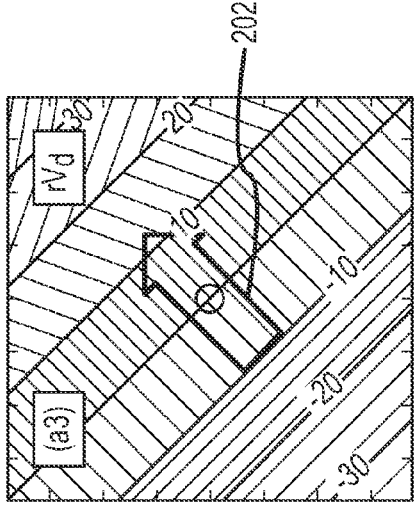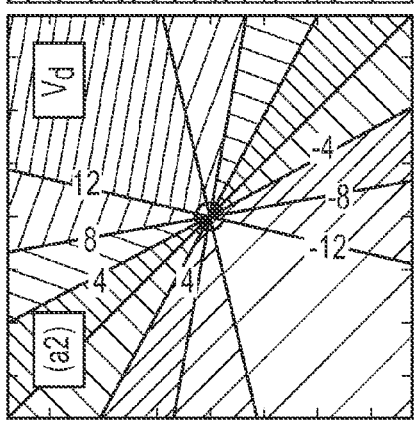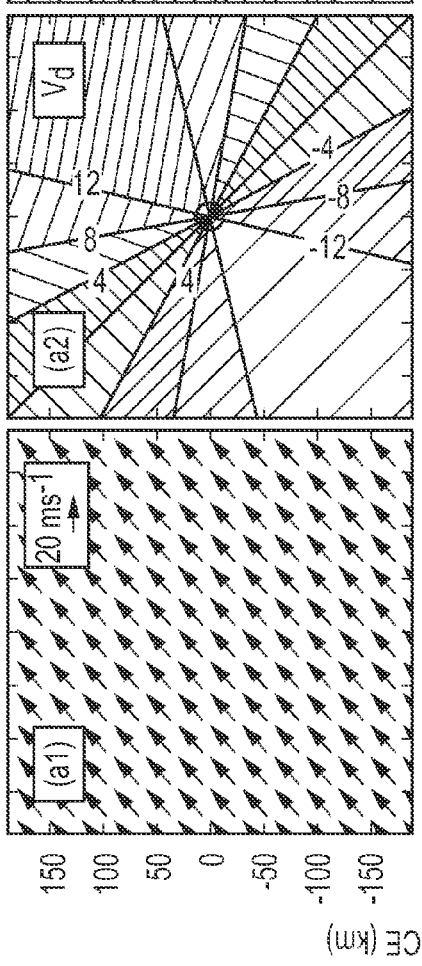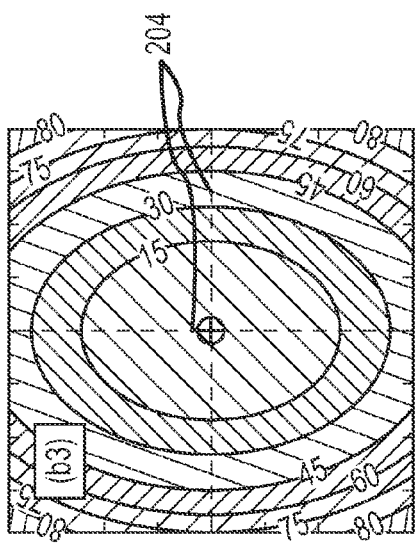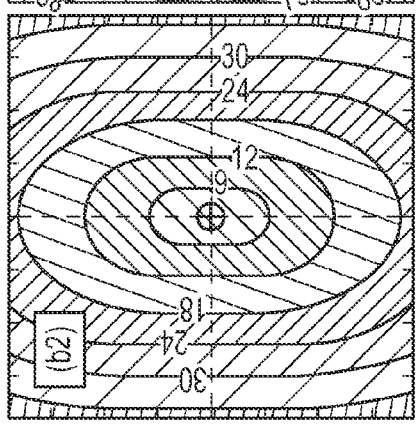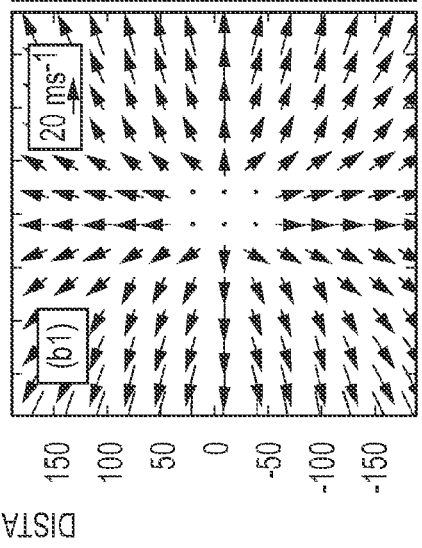

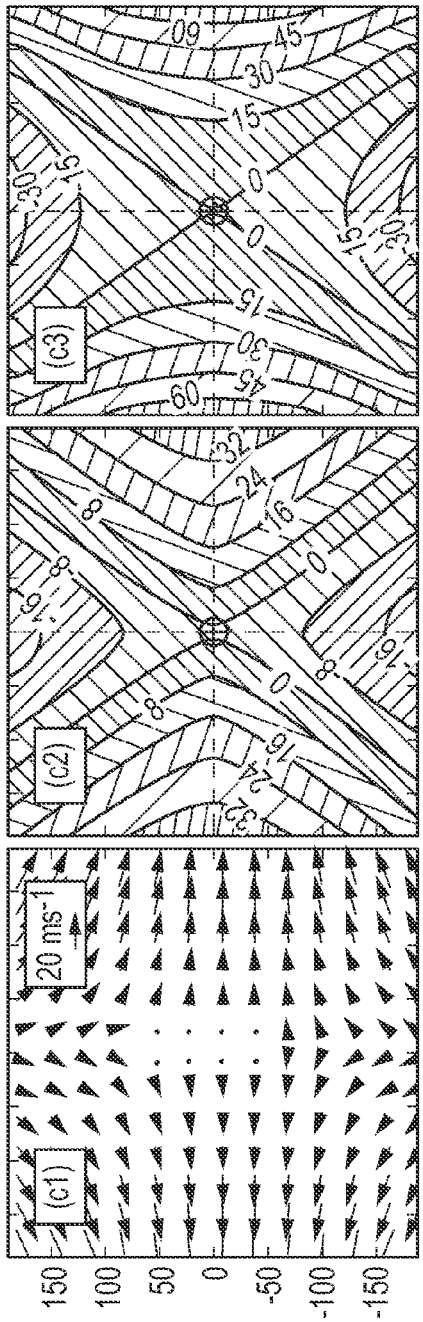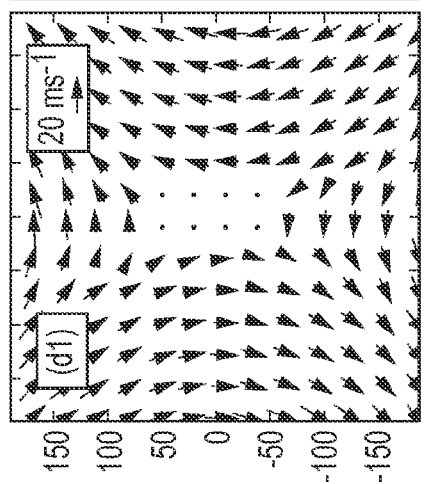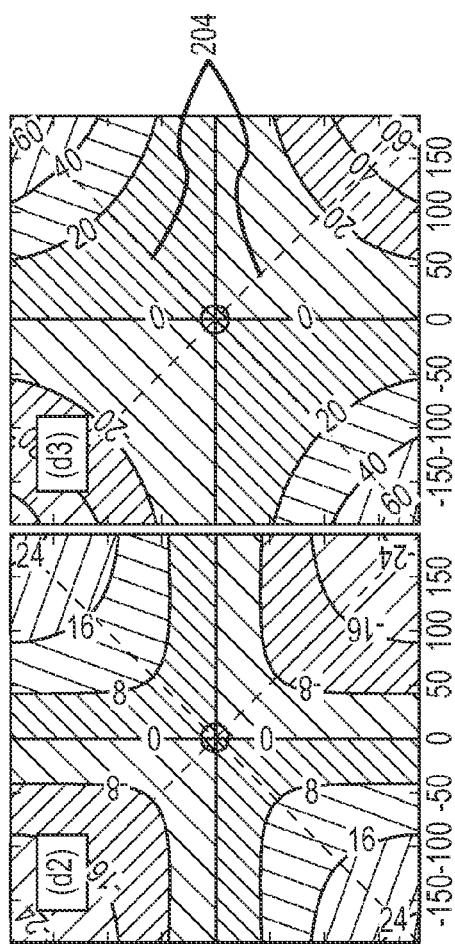

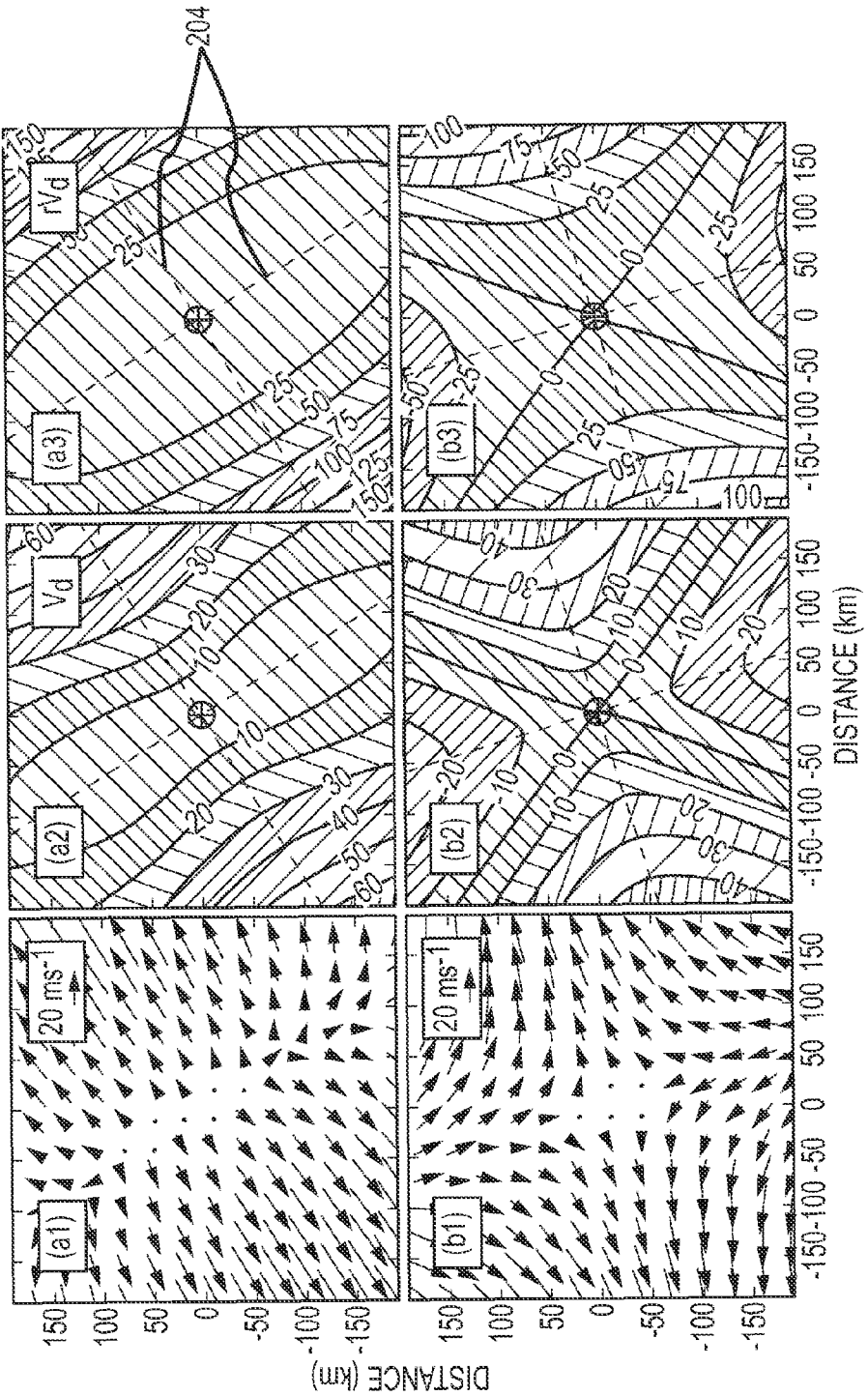

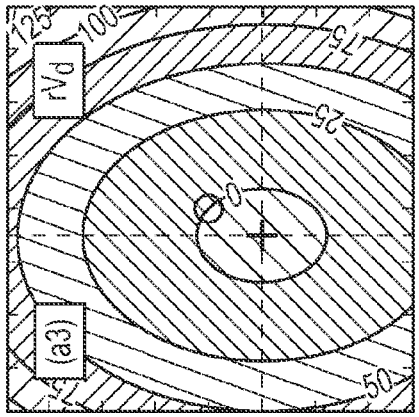
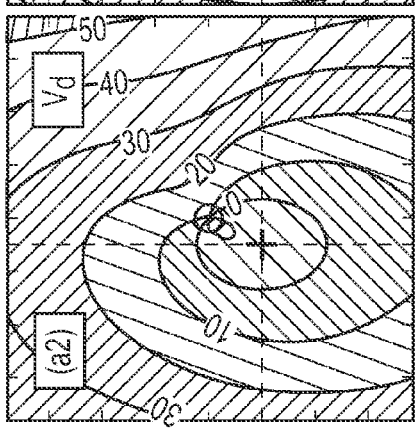
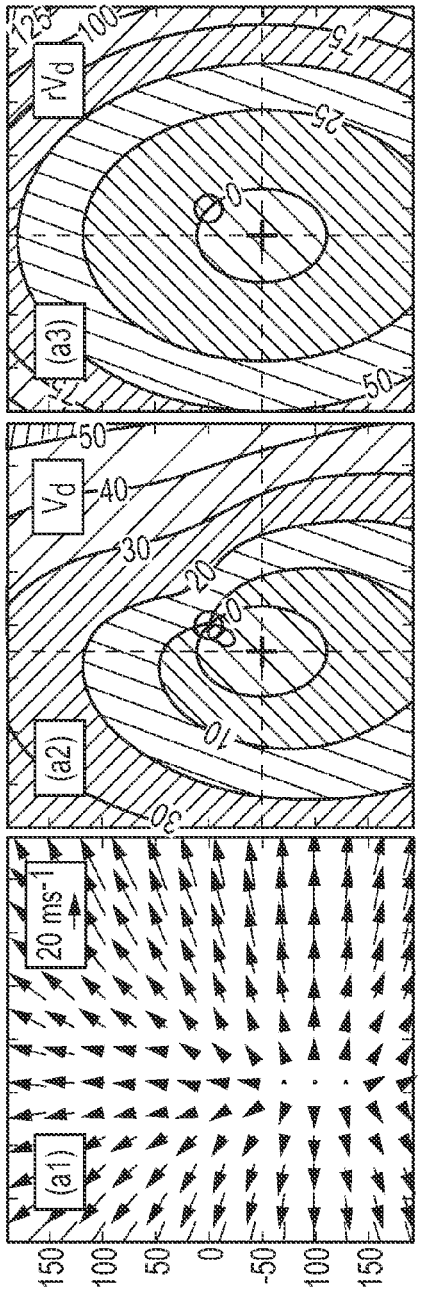
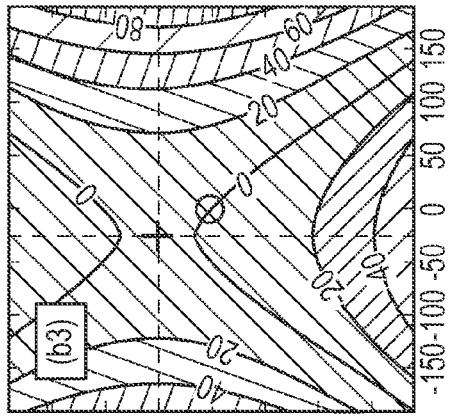
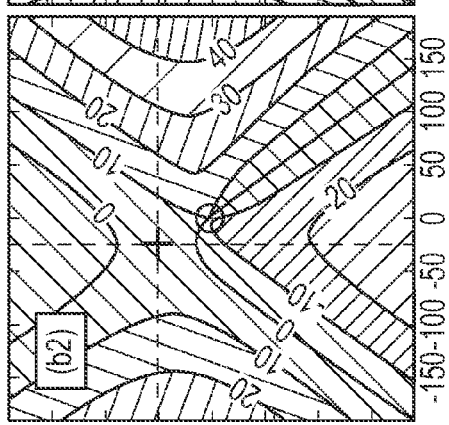
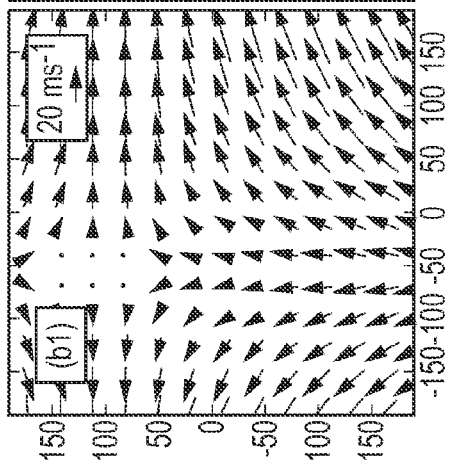

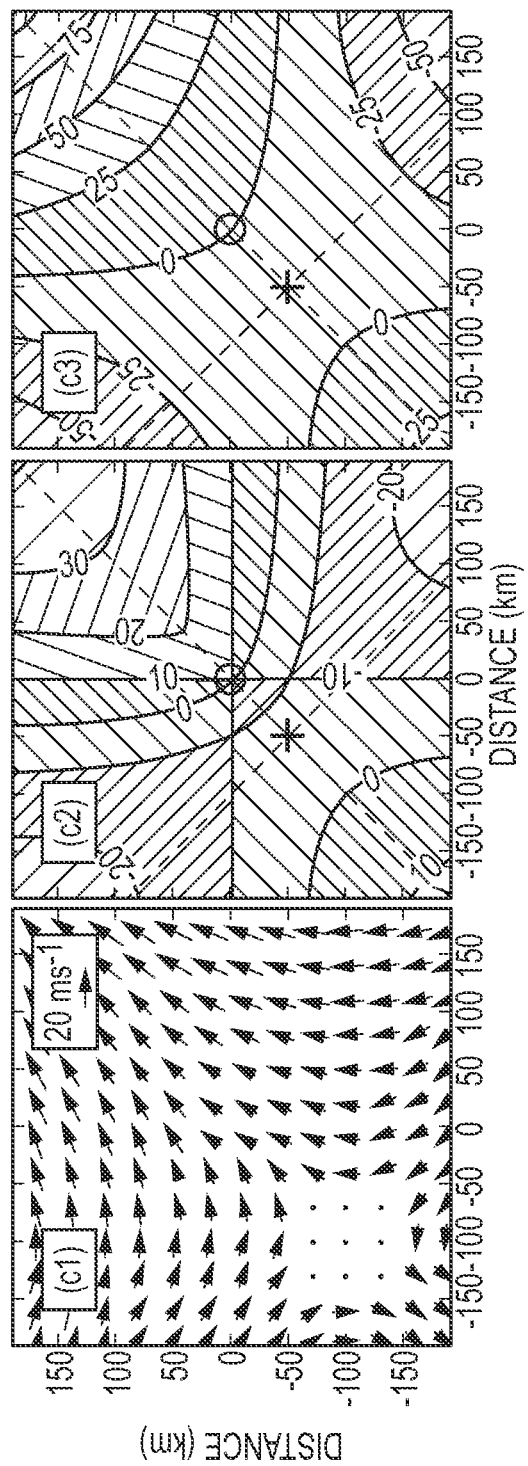

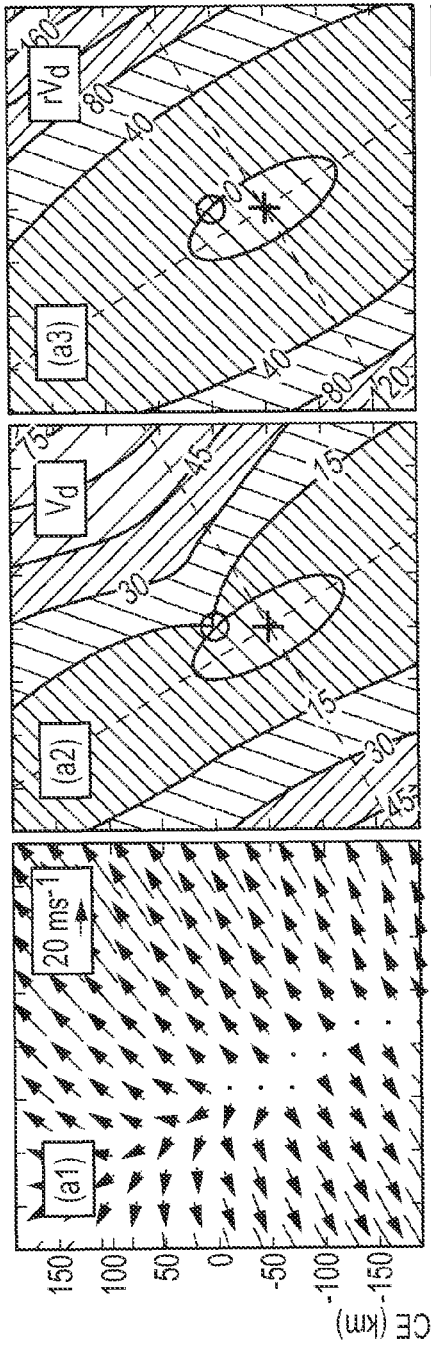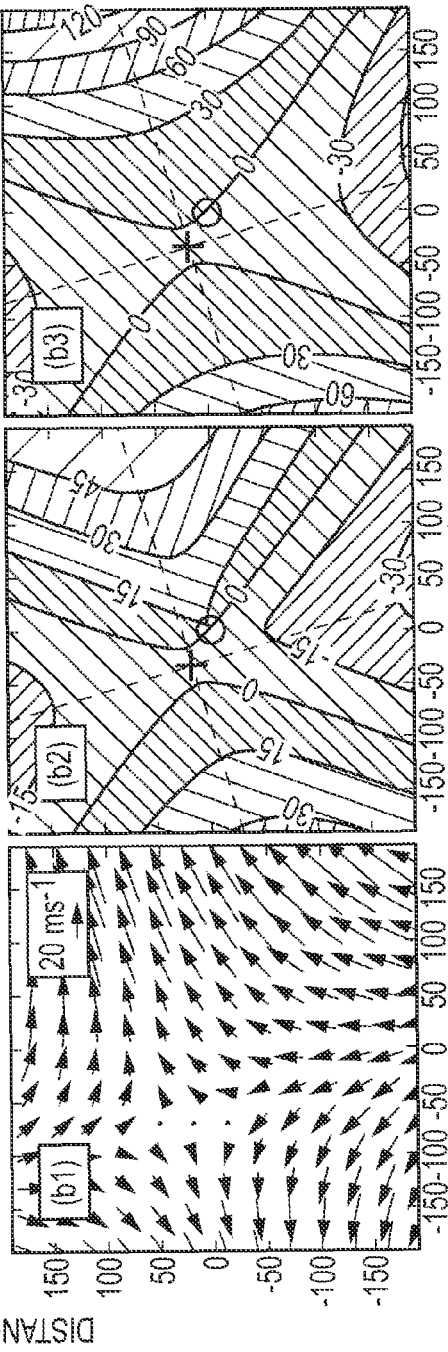

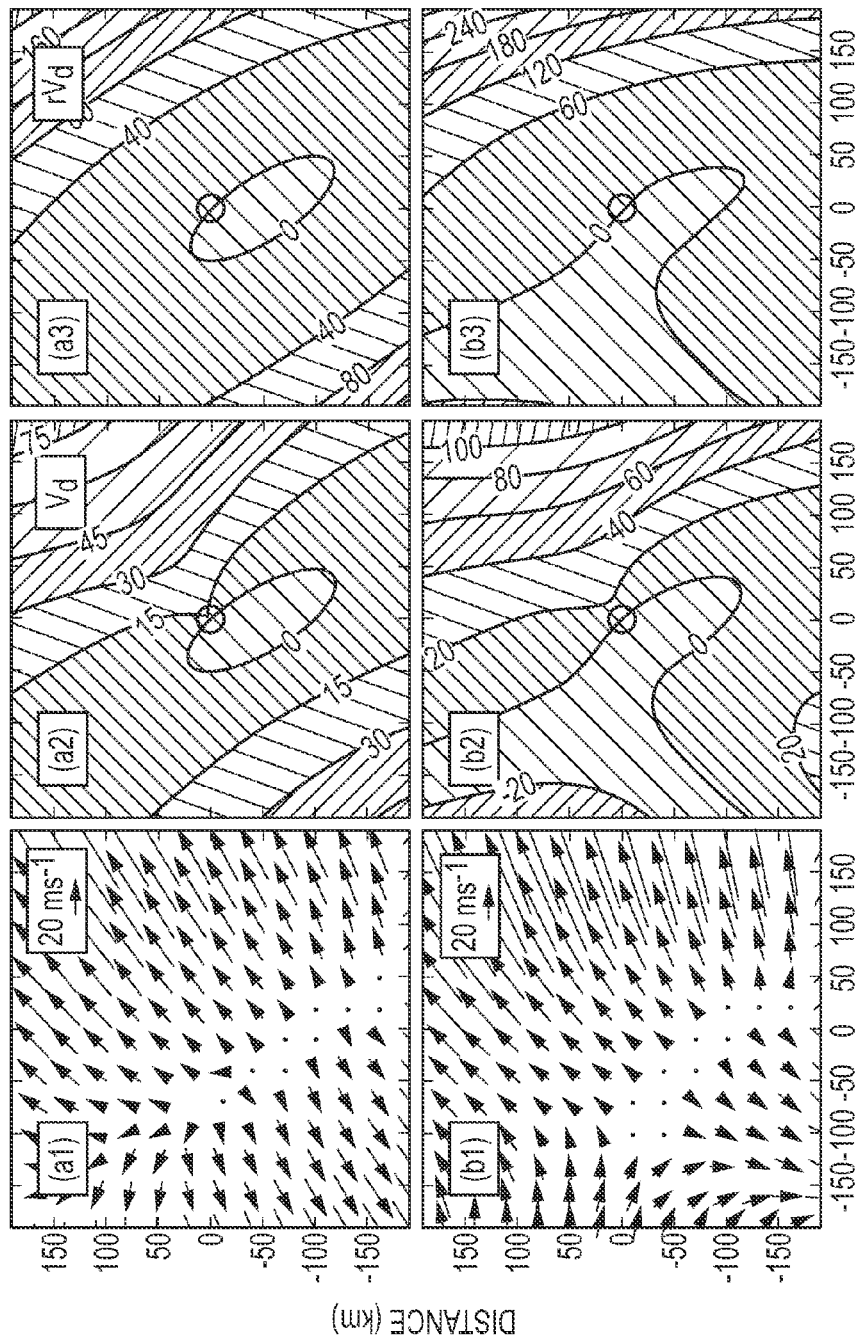

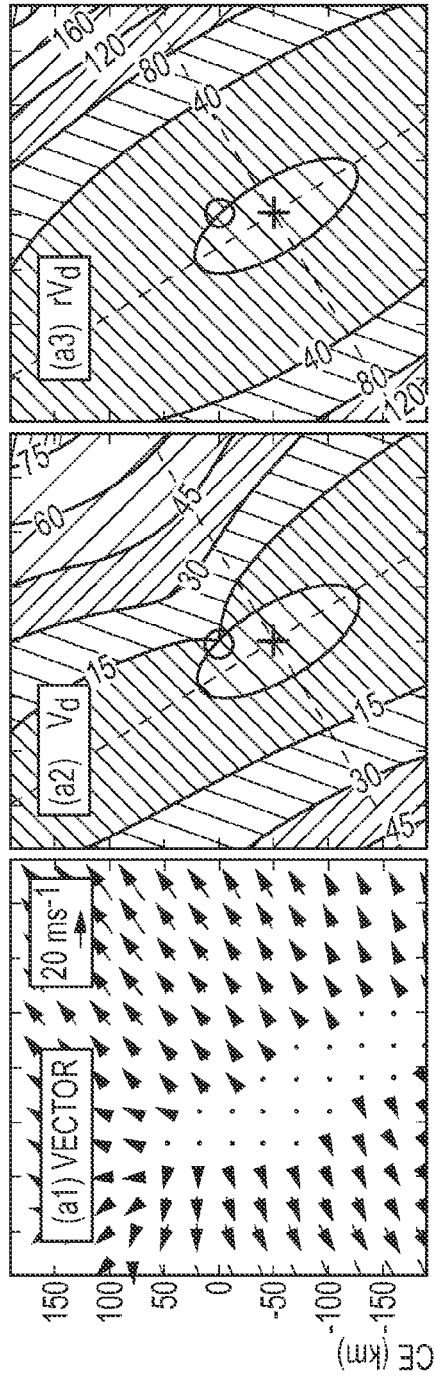

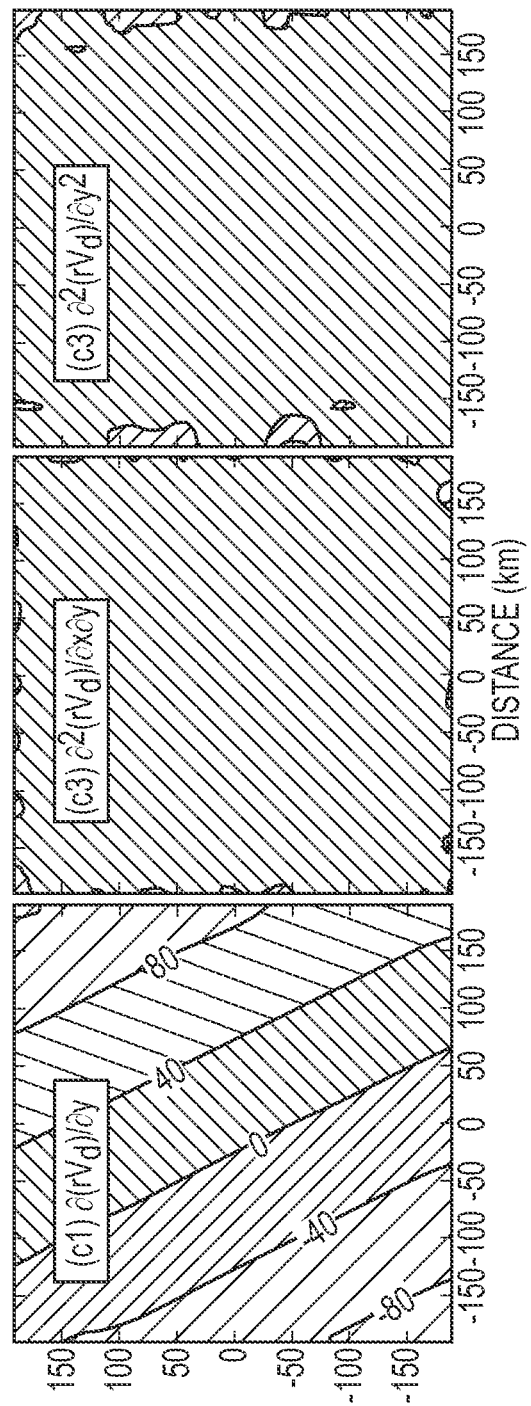

METHOD AND SYSTEM FOR GENERATING A DISTANCE VELOCITY AZIMUTH DISPLAY

GOVERNMENT LICENSE RIGHTS

The U.S. Government has a paid-up license in this invention and the right in limited circumstances to require the patent owner to license others on reasonable terms as provided for by the terms of Agreement No. M0856145 awarded by the National Science Foundation and Agreement No. NA11OAR4310201 awarded by the National Oceanic and Atmospheric Association.

TECHNICAL FIELD

The present Application is directed towards velocity azimuth displays, and more particularly, to a velocity azimuth display method that scales Doppler velocity by the distance from a radar to a gate to analyze linear and non-linear wind fields from single Doppler radar data.

BACKGROUND OF THE INVENTION

Understanding the wind flow structure of meteorological phenomena from a single ground-based Doppler radar data has proved difficult despite numerous prior art approaches. Due to the practical limitations of dual-Doppler radar observations, existing approaches have focused mainly on single-Doppler radar observations. It is possible to observe qualitative characteristics of simple meteorological flow patterns such as straight-line wind, rotational wind, and converging/diverging wind with a single Doppler radar. In order to quantify wind structures such as convergence, deformation, and voracity, however, wind retrieval algorithms such as velocity azimuthal display (VAD), volume velocity processing (VVP), or velocity track display (VTD) must be applied to single-Doppler radar data. The current wind retrieval algorithms in use have limitations in that they provide underlying flow models that are either centered at the radar or at a user selected location. The radial velocity information that these algorithms provide have a vector-like property that lacks a general relationship to the corresponding three dimensional (3D) Cartesian wind vectors.

The present application overcomes some of these drawbacks and presents a new algorithm which substantially eliminates the limitations of the above-mentioned wind retrieval algorithms, allowing for better qualitative and quantitative analysis of both linear and non-linear atmospheric flow patterns. According to an embodiment of the invention, the algorithm used by the present invention fits an atmospheric flow pattern detected at a single-Doppler radar to a distance Doppler velocity, $rV_d$, where $V_d$ is the Doppler velocity and r is the distance between the radar and the gate. By scaling Doppler velocity data to r, the data can be expressed via a polynomial representation. For linear wind fields, $rV_d$ may be mathematically represented as a quadratic curve from which some linear features may be graphically estimated. For non-linear wind fields, the mathematical representation of $rV_d$ is much simpler than that produced by other wind retrieval algorithms.

The present application provides a distance velocity azimuth display (DVAD) technique and its applications to wind fields. The technique of the present Application extends the foundation of VAD already established in an attempt to address the limitations inherent in the VAD technique. Wind field kinematic structures displayed in the DVAD, or $rV_d$ space simplify the interpretation of the radar signature and eliminate the geometric distortion inherited in the VAD, or $V_d$ space. The present invention makes the interpretation and computation of gross wind field properties more intuitive.

SUMMARY OF THE INVENTION

A method for determining a kinematic structure of a two-dimensional (2D) wind field is provided according to an embodiment of the Application. The method comprises receiving a plurality of Doppler velocities and a plurality of distances between a Doppler radar and a gate. Each Doppler velocity of the plurality of Doppler velocities corresponds to a respective distance of the plurality of distances between the Doppler radar and the gate. A plurality of distance Doppler velocity values are calculated. The distance Doppler velocity values represent the plurality of measured Doppler velocities, and the distance between the Doppler radar and the gate. The kinematic structure of the 2D wind field is estimated using a conic section of the plurality of distance Doppler wind velocity values.

A system for determining a kinematic structure of a two-dimensional wind field is provided according to an embodiment of the Application. The system includes a data receiving module configured to receive a plurality of Doppler velocities and a plurality of distances between a Doppler radar and a gate. Each Doppler velocity of the plurality of Doppler velocities corresponds to a respective distance of the plurality of distances between the Doppler radar and the gate. The system further includes a calculation module configured to calculate a plurality of distance Doppler velocity values representing the plurality of measured Doppler velocities and the distance between the Doppler radar and the gate. The system further includes an estimation module configured to estimate the kinematic structure of the 2D wind field using a conic section the plurality of distance Doppler wind velocity values.

ASPECTS

Preferably, the kinematic structure of the 2D wind field that is estimated using the plurality of distance Doppler wind velocity values includes linear features.

Preferably, the kinematic structure of the 2D wind field that is estimated using the plurality of distance Doppler wind velocity values includes non-linear features.

Preferably, estimating the kinematic structure of the 2D wind field using the plurality of distance Doppler wind velocity values includes estimating a constant background wind from a translation of the conic section of the plurality of distance Doppler wind velocity values from the Doppler radar.

Preferably, estimating the kinematic structure of the 2D wind field using the plurality of distance Doppler wind velocity values includes estimating at least one of a divergence, a shearing deformation, a stretching deformation, a divergence, and a deformation of the 2D wind field from the conic section of the plurality of distance Doppler wind velocity values.

Preferably, estimating the kinematic structure of the 2D wind field using the plurality of distance Doppler wind velocity values includes estimating a shearing deformation of the 2D wind field from an angle required to align a primary axis of the conic section of the plurality of distance Doppler wind velocity values with an x-axis or a y-axis of a graphic representation of the plurality of distance Doppler wind velocity values.

Preferably, estimating the kinematic structure of the 2D wind field using the plurality of distance Doppler wind velocity values includes estimating a shearing deformation of the 2D wind field by performing a least squares fit on the plurality of distance Doppler wind velocity values.

Preferably, estimating the kinematic structure of the 2D wind field using the plurality of distance Doppler wind velocity values includes estimating at least one of a constant wind background, a divergence, a shearing deformation, a stretching deformation, a divergence, and a deformation of the 2D wind field by differentiating the plurality of distance Doppler wind velocity values.

Preferably, estimating the kinematic structure of the 2D wind field using the plurality of distance Doppler wind velocity values includes estimating a non-linear feature of the 2D wind field by successively differentiating the plurality of distance Doppler wind velocity values.

Preferably, successively differentiating the plurality of distance Doppler wind velocity values further includes filtering noise from the plurality of distance Doppler wind velocity values.

Preferably, the method further comprises the step of displaying the Doppler wind velocity values.

Preferably, the estimation module estimates the kinematic structure of the 2D wind field using the plurality of distance Doppler wind velocity values by estimating a constant background wind from a translation of the conic section of the plurality of distance Doppler wind velocity values from the Doppler radar.

Preferably, the estimation module estimates the kinematic structure of the 2D wind field using the plurality of distance Doppler wind velocity values by estimating at least one of a divergence, a shearing deformation, a stretching deformation, a divergence, and a deformation of the 2D wind field from the conic section of the plurality of distance Doppler wind velocity values.

Preferably, the estimation module estimates the kinematic structure of the 2D wind field using the plurality of distance Doppler wind velocity values by estimating a shearing deformation of the 2D wind field from an angle required to align a primary axis of the conic section of the plurality of distance Doppler wind velocity values with an axis of a graphic representation of the plurality of distance Doppler wind velocity values.

Preferably, the estimation module estimates the kinematic structure of the 2D wind field using the plurality of distance Doppler wind velocity values by estimating a shearing deformation of the 2D wind field by performing a least squares fit on the plurality of distance Doppler wind velocity values.

Preferably, the estimation module estimates the kinematic structure of the 2D wind field using the plurality of distance Doppler wind velocity values by estimating at least one of a constant wind background, a divergence, a shearing deformation, a stretching deformation, a divergence, and a deformation of the 2D wind field by differentiating the plurality of distance Doppler wind velocity values.

Preferably, the estimation module estimates the kinematic structure of the 2D wind field using the plurality of distance Doppler wind velocity values by estimating a non-linear feature of the 2D wind field by successively differentiating the plurality of distance Doppler wind velocity values.

Preferably, the estimation module estimates a differentiation of the plurality of distance Doppler wind velocity values further includes filtering noise from the plurality of distance Doppler wind velocity values.

Preferably, the system further comprises a display module configured to display the Doppler wind velocity values.

BRIEF DESCRIPTION OF THE DRAWINGS

FIG. 1a shows a display of a constant easterly mean wind with a magnitude of 10 m/s.

FIG. 1b shows the corresponding observed Doppler velocity of the mean wind of FIG. 1a.

FIG. 1c shows the corresponding observed $rV_d$ display of the mean wind of FIG. 1a, in accordance with an embodiment of the Application.

FIG. 1d shows a Rankine-combined vortex.

FIG. 1e shows the corresponding observed Doppler velocity of the Rankine-combined vortex of FIG. 1d.

FIG. 1f shows the corresponding observed $rV_d$ display of the Rankine-combined vortex of FIG. 1d, in accordance with an embodiment of the Application.

FIG. 2a1 shows uniform southwesterly wind.

FIG. 2a2 shows the corresponding observed Doppler velocity of the uniform southwesterly wind of FIG. 2a1.

FIG. 2a3 shows the corresponding observed $rV_d$ display of the uniform southwesterly wind of FIG. 2a1, in accordance with an embodiment of the Application.

FIG. 2b1 shows a zero shearing deformation flow ($u_x v_y > 0$).

FIG. 2b2 shows the corresponding observed Doppler velocity of the zero shearing ($u_x v_y > 0$) deformation flow of FIG. 2b1.

FIG. 2b3 shows the corresponding observed $rV_d$ display of the zero shearing ($u_x v_y > 0$) deformation flow of FIG. 2b1, in accordance with an embodiment of the Application.

FIG. 2c1 shows a zero shearing deformation flow ($u_x v_y < 0$).

FIG. 2c2 shows the corresponding observed Doppler velocity of the zero shearing ($u_x v_y < 0$) deformation flow of FIG. 2c1.

FIG. 2c3 shows the corresponding observed $rV_d$ display of the zero shearing ($u_x v_y < 0$) deformation flow of FIG. 2c1, in accordance with an embodiment of the Application.

FIG. 2d1 shows a pure shearing deformation flow.

FIG. 2d2 shows the corresponding observed Doppler velocity of the pure shearing deformation flow of FIG. 2d1.

FIG. 2d3 shows the corresponding observed $rV_d$ display of the pure shearing deformation flow of FIG. 2d1, in accordance with an embodiment of the Application.

FIG. 3a1 shows a mixed divergence ($u_x v_y > 0$) and shearing deformation flow.

FIG. 3a2 shows the corresponding observed Doppler velocity of the mixed divergence ($u_x v_y > 0$) and shearing deformation flow of FIG. 3a1.

FIG. 3a3 shows the corresponding observed $rV_d$ display of the mixed divergence ($u_x v_y > 0$) and shearing deformation flow of FIG. 3a1, in accordance with an embodiment of the Application.

FIG. 3b1 shows a mixed divergence ($u_x v_y < 0$) and shearing deformation flow.

FIG. 3b2 shows the corresponding observed Doppler velocity of the mixed divergence ($u_x v_y < 0$) and shearing deformation flow of FIG. 3b1.

FIG. 3b3 shows the corresponding observed $rV_d$ display of the mixed divergence ($u_x v_y < 0$) and shearing deformation flow of FIG. 3b1, in accordance with an embodiment of the Application.

FIG. 4a1 shows a zero shearing deformation flow ($u_x v_y > 0$) with constant wind.

FIG. 4a2 shows the corresponding observed Doppler velocity of the zero shearing deformation flow ($u_xv_y>0$) with constant wind of FIG. 4a1.

FIG. 4a3 shows the corresponding observed $rV_d$ display of the zero shearing deformation flow ($u_xv_y>0$) with constant wind of FIG. 4a1, in accordance with an embodiment of the Application.

FIG. 4b1 shows a zero shearing deformation flow ($u_xv_y<0$) with constant wind.

FIG. 4b2 shows the corresponding observed Doppler velocity of the zero shearing deformation flow ($u_xv_y<0$) with constant wind of FIG. 4b1.

FIG. 4b3 shows the corresponding observed $rV_d$ display of the zero shearing deformation flow ($u_xv_y<0$) with constant wind of FIG. 4b1, in accordance with an embodiment of the Application.

FIG. 4c1 shows a pure shearing deformation flow with constant wind.

FIG. 4c2 shows the corresponding observed Doppler velocity of the pure shearing deformation flow with constant wind of FIG. 4c1.

FIG. 4c3 shows the corresponding observed $rV_d$ display of the pure shearing deformation flow with constant wind of FIG. 4c1, in accordance with an embodiment of the Application.

FIG. 5a1 shows mixed divergence ($u_xv_y>0$) and shearing deformation flow with constant wind.

FIG. 5a2 shows the corresponding observed Doppler velocity of the mixed divergence ($u_xv_y>0$) and shearing deformation flow with constant wind of FIG. 5a1.

FIG. 5a3 shows the corresponding observed $rV_d$ display of mixed divergence ($u_xv_y>0$) and shearing deformation flow with constant wind of FIG. 5a1, in accordance with an embodiment of the Application.

FIG. 5b1 shows mixed divergence ($u_xv_y<0$) and shearing deformation flow with constant wind.

FIG. 5b2 shows the corresponding observed Doppler velocity of the mixed divergence ($u_xv_y<0$) and shearing deformation flow with constant wind of FIG. 5b1.

FIG. 5b3 shows the corresponding observed $rV_d$ display of mixed divergence and shearing ($u_xv_y<0$) deformation flow with constant wind of FIG. 5b1, in accordance with an embodiment of the Application.

FIG. 6a1 shows mixed divergence ($u_xv_y>0$) and shearing deformation flow with constant wind in a weak non-linear field.

FIG. 6a2 shows the corresponding observed Doppler velocity of the mixed divergence ($u_xv_y>0$) and shearing deformation flow with constant wind in a weak non-linear field of FIG. 6a1.

FIG. 6a3 shows the corresponding observed $rV_d$ display of mixed divergence ($u_xv_y>0$) and shearing deformation flow with constant wind in a weak non-linear field of FIG. 6a1, in accordance with an embodiment of the Application.

FIG. 6b1 shows mixed divergence and shearing ($u_xv_y<0$) deformation flow with constant wind in a weak non-linear field.

FIG. 6b2 shows the corresponding observed Doppler velocity of the mixed divergence and shearing ($u_xv_y<0$) deformation flow with constant wind in a weak non-linear field of FIG. 6b1.

FIG. 6b3 shows the corresponding observed $rV_d$ display of mixed divergence and shearing ($u_xv_y<0$) deformation flow with constant wind in a weak non-linear field of FIG. 6b1, in accordance with an embodiment of the Application.

FIG. 7a1 shows a linear wind field with noise.

FIG. 7a2 shows the corresponding observed Doppler velocity of the linear wind field with noise of FIG. 7a1.

FIG. 7a3 shows the corresponding observed $rV_d$ display of the linear wind field with noise of FIG. 7a1, in accordance with an embodiment of the Application.

FIG. 7b1 shows the corresponding observed $\partial(rV_d)/\partial x$ term display of the linear wind field with noise of FIG. 7a1, in accordance with an embodiment of the Application.

FIG. 7b2 shows the corresponding observed $\partial^2(rV_d)/\partial x^2$ term display of the linear wind field with noise of FIG. 7a1, in accordance with an embodiment of the Application.

FIG. 7b3 shows the corresponding observed $\partial^2(rV_d)/\partial x\partial$ term display of the linear wind field with noise of FIG. 7a1, in accordance with an embodiment of the Application.

FIG. 7c1 shows the corresponding observed $\partial(rV_d)/\partial y$ term display of the linear wind field with noise of FIG. 7a1, in accordance with an embodiment of the Application.

FIG. 7c2 shows the corresponding observed $\partial^2(rV_d)/\partial y\partial x$ term display of the linear wind field with noise of FIG. 7a1, in accordance with an embodiment of the Application.

FIG. 7c3 shows the corresponding observed $\partial^2(rV_d)/\partial y^2$ term display of the linear wind field with noise of FIG. 7a1, in accordance with an embodiment of the Application.

FIG. 8b shows s-band Doppler radar reflectivity observations in shading overlaid with corresponding observed $rV_d$ contours for the wind field of FIG. 8a.

FIG. 8c shows the corresponding observed Doppler velocity in shading, overlaid with Doppler velocity contours for the wind field of FIG. 8a.

FIG. 8d shows the corresponding observed Doppler velocity in shading, overlaid with corresponding observed $rV_d$ contours for the wind field of FIG. 8a.

DETAILED DESCRIPTION OF THE INVENTION

Figure 8B:
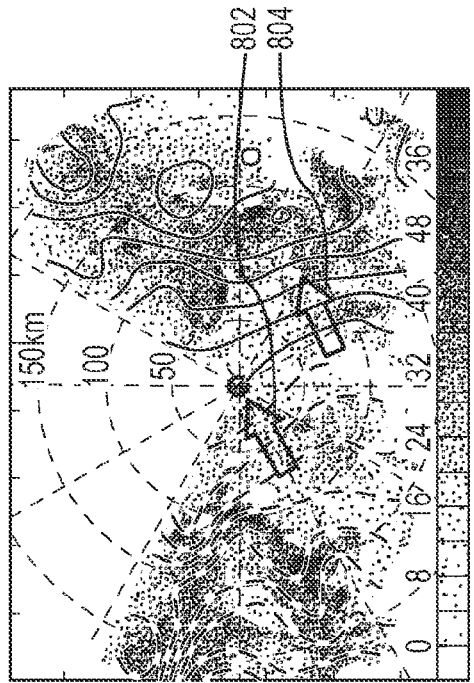

FIGS. 1-10 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the application. Those skilled in the art will appreciate that the features described below can be combined in various ways to form multiple variations of the Application. As a result, the Application is not limited to the specific examples described below, but only by the claims and their equivalents.

According to an embodiment of the Application, a method for determining a kinematic structure of a two-dimensional (2D) wind field is provided. A Doppler radar (not shown) transmits a plurality of pulses towards a predefined volume of an atmosphere. The signals transmitted from the Doppler radar are reflected back towards the radar as is generally understood in the art. The radial wind velocity at the point of reflection distorts the signal resulting in a Doppler shift of the reflected signal. If the velocity of the wind is towards the radar, the Doppler shift results in an increase in the frequency of the received signal. Conversely, if the wind is away from the radar, the Doppler shift results in a decrease in the frequency of the received signal. If the wind velocity is perpendicular to the radar, the Doppler velocity will be substantially zero. Therefore, the Doppler radar only receives the radial component of the moving target (wind). Doppler radars are widely used in atmospheric research and the description of the Doppler signal is greatly simplified for the purpose of brevity. Therefore, it is appreciated that in actuality, the transmission and reception performed by the Doppler radar is much more complicated. For example, in order to obtain sufficient information about the atmospheric vortex, data can be collected at a plurality of radii around the vortex center as is known in the art. A processor may be used to process the data received by the Doppler radar as is known in the art.

For a radar located at the origin, the Doppler velocity, $V_d$, at any point P(x, y, z) in space can be expressed in terms of the three-dimensional Cartesian velocities, u, v, and, w, and the Spherical coordinate parameters, mathematic angle, $\theta$ (defined as 0° pointing East and increasing positively counterclockwise), elevation angle, $\phi$, and range, r, from the radar to each gate:

$$r = (x^2 + y^2 + z^2)^{1/2}$$

$$\theta = \tan^{-1} y/x$$

$$\phi = \sin^{-1} z/r$$

$$V_d = u \cos\theta \cos\phi + v \sin\theta \cos\phi + w \sin\phi$$

$$= u\frac{x}{r} + v\frac{y}{r} + w\frac{z}{r}$$

Hence, by multiplying r on both sides, the following is obtained:

$$rV_d = ux + vy + wz \quad (1)$$

To simplify the model, the contribution from the terminal fall velocity of the particle, the effects of atmospheric refraction and earth curvature on radar beam height will be ignored.

It may be seen that $rV_d$ and $V_d$ differ in many aspects. For example, $rV_d$ may be expressed exactly by Cartesian coordinate quantities while $V_d$ includes the spherical coordinate quantity, r. While coordinate transformations may alter the form of the mathematical expressions into a more convenient form, they do not generally add information.

It may further be seen that the gradient of $rV_d$ provides:

$$\nabla(rV_d) = (u + xu_x + yv_x + zw_x)i + (v + xu_y + yv_y + zw_y)j + \quad (2)$$
$$(u + xu_z + yv_z + zw_z)k$$
$$= V + (xu_x + yv_x + zw_x)i + (xu_y + yv_y + zw_y)j +$$
$$(xu_z + yv_z + zw_z)k$$

Because V=ui+vj+wk is the 3D Cartesian velocity vector of a target at point P, $rV_d$ possesses a property similar to a type of velocity potential (a scalar) in fluid mechanics. The gradient of $rV_d$ is the three-dimensional velocity vector, V, plus the first derivative of each of u, v, and w scaled by a corresponding respective Cartesian distance x, y, and z. The first order derivative terms in Equation (2) prevent the direct computation of the velocity vector V anywhere besides at the origin (i.e., the radar). When the last three terms on the right-hand-side of Equation (2) are small, $\nabla(rVd)$ is a proxy of the 3D velocity vector V. However, without further knowledge of the spatial gradient of the velocity field, the use of $\nabla(rV_d)$ as a proxy of the 3D velocity vector V is mostly valid in a region closest to the radar.

In order to investigate the properties of $rV_d$ for linear and non-linear wind fields, u, v, and w of Equation (1) may be expanded in Taylor series with respect to the origin ($x_0$, $y_0$, $z_0$) in space. Equation (1) takes a form of trivariate polynomial as follows:

$$rV_d(x_0 + \Delta x, y_0 + \Delta y, z_0 + \Delta z) = \quad (3)$$
$$u \times (x_0 + \Delta x) + v \times (y_0 + \Delta y) + w \times (z_0 + \Delta z) =$$
$$u_0 x_0 + v_0 y_0 + w_0 z_0 + u_0 \Delta x + v_0 \Delta y + w_0 \Delta z + u_x x_0 \Delta x +$$
$$u_x(\Delta x)^2 + u_y x_0 \Delta y + u_y \Delta x \Delta y + u_z x_0 \Delta z + u_z \Delta x \Delta z +$$
$$v_x \Delta x \Delta y + v_x y_0 \Delta x + v_y (\Delta y)^2 + v_y y_0 \Delta y + v_z \Delta y \Delta z +$$
$$v_z y_0 \Delta z + w_x z_0 \Delta x + w_x \Delta x \Delta z + w_y z_0 \Delta y + w_y \Delta y \Delta z +$$
$$\frac{1}{2}[u_{xx} x_0 (\Delta x)^2 + u_{xx}(\Delta x)^3 + u_{yy} x_0 (\Delta y)^2 + u_{yy} \Delta x (\Delta y)^2 +$$
$$u_{zz} x_0 (\Delta z)^2 + u_{zz} \Delta x (\Delta z)^2] + [u_{xy} x_0 \Delta x \Delta y + u_{xy} (\Delta x)^2 \Delta y +$$
$$u_{xz} x_0 \Delta x \Delta z + u_{xz} (\Delta x)^2 \Delta z + u_{yz} x_0 \Delta y \Delta z + u_{xy} \Delta x \Delta y \Delta z] +$$
$$\frac{1}{2}[v_{xx} y_0 (\Delta x)^2 + v_{xx}(\Delta)^2 \Delta y + v_{yy} y_0 (\Delta y)^2 + v_{yy}(\Delta y)^3 +$$
$$v_{zz} y_0 (\Delta z)^2 + v_{zz} \Delta y (\Delta z)^2] + [v_{xy} y_0 \Delta x \Delta y + v_{xy}(\Delta y)^2 \Delta x +$$
$$v_{xz} y_0 \Delta x \Delta z + v_{xz} \Delta x \Delta y \Delta z + y_{yz} y_0 \Delta y \Delta z + v_{xy}(\Delta y)^2 \Delta z] +$$
$$\frac{1}{2}[w_{xx} z_0 (\Delta x)^2 + w_{xx}(\Delta x)^2 \Delta z + w_{yy} z_0 (\Delta y)^2 + w_{yy}(\Delta y)^2 \Delta z +$$
$$w_{zz} z_0 (\Delta z)^2 + w_{zz}(\Delta z)^3] + [w_{xy} z_0 \Delta x \Delta y + w_{xy} \Delta x \Delta y \Delta z +$$
$$w_{xz} z_0 \Delta x \Delta z + w_{xz} \Delta x (\Delta z)^2 + w_{yz} z_0 \Delta y \Delta z + w_{xy}(\Delta z)^2 \Delta y] + \ldots$$

In Equation (3), $u_0$, $v_0$, and $w_0$ are the three dimensional velocities at the point ($x_0$, $y_0$, $z_0$). The right-hand-side of Equation (3) is a polynomial expressed in a Cartesian coordinate system, with the highest order being one above the highest order of the underlying linear or non-linear flow fields. Although the Taylor series may be expanded with respect to any point other than the radar at the origin, there are no advantages to doing so because Equation (3) become unnecessarily complicated and the full wind field can only be deduced at the radar. Therefore, Equation (3) may be simplified by expanding the Taylor series with respect to the radar (i.e., $x_0 = y_0 = z_0 = 0$).

To further simplify $rV_d$, it is possible to use the 2D form of Equation (3) by setting $\Delta z = 0$, $\Delta x = x$, and $\Delta y = y$. Equation (3) then becomes:

$$rV_d = u_0 x + v_0 y + u_x x^2 + (u_y + v_x)xy + v_y y^2 + \quad (4)$$
$$\frac{1}{2}[u_{xx} x^3 + (u_{xx} + 2u_{xy})x^2 y + (u_{yy} + 2v_{xy})xy^2 + v_{yy} y^3] + \ldots,$$

Equation (4) is in the form of a standard polynomial, with the coefficient of each term being a combination of physical quantities of a given wind field. Equation (4) may be used to process 2D Doppler radar data, for example it may be used to process plan position indicator (PPI) or constant-altitude plan position indicator (CAPPI) data. The 2D assumption made to simplify the terms of $rV_d$ is most valid at lower altitudes. Since the geometric characteristics of polynomials expressed in Equation (4) are easy to recognize visually, especially for the first- and second-order polynomials, displaying and processing $rV_d$ instead of $V_d$ may greatly simplify the interpretation and computation of the gross wind field properties. In addition, $rV_d$ also provides a more intuitive display of wind field properties.

For linear wind fields, the second-order derivatives of Equation (4) by definition are zero. Equation (4) therefore simplifies to:

$$0 = u_0 x + v_0 y + u_x x^2 + (u_y + v_x)xy + v_y y^2 - rV_d \quad (5)$$
$$= u_x x^2 + (u_y + v_x)xy + v_y y^2 + u_0 x + v_0 y - rV_d$$
$$= u_x(x - x_0)^2 + (u_y + v_x)(x - x_0)(y - y_0) + v_y(y - y_0)^2 + F$$

where $$F = \begin{vmatrix} u_x & (u_y + v_x)/2 & u_0/2 \\ (u_y + v_x)/2 & v_y & v_0/2 \\ u_0/2 & v_0/2 & -rV_d \end{vmatrix} \Big/ \begin{vmatrix} u_x & (u_y + v_x)/2 \\ (u_y + v_x)/2 & v_y \end{vmatrix}$$

Equation (5) is a bivariate quadratic equation, represented by conic sections. Different types of linear wind fields yield different types of conic sections. An example wind field may be represented by a non-degenerate quadratic curve such as an ellipse, a parabola, or a hyperbola.

Meteorologically speaking, divergence, stretching deformation, and shearing deformation control the $rV_d$ pattern. Different linear wind field properties may be represented by different combinations of $u_x$, $u_y$, $v_x$, $v_y$, $u_0$, and $v_0$. For example, $u_x+v_y$ may represent the divergence of a wind field, $u_x-v_y$ may represent the stretching deformation of a wind field, $u_y+v_x$ may represent the shearing deformation of a wind field, and $u_0$, and $v_0$ may represent a constant wind field. Vorticity ($v_x-u_y$) may not be resolvable, however.

In Equation (5) the geometric features of the quadratic equation are determined by the sign of the discriminant, $\delta = (u_y+v_x)^2/4 - u_x v_y$:
1. $\delta<0$, a set of ellipses (If $u_x=v_y\neq0$ and $u_y+v_x=0$, represents a circle);
2. $\delta=0$, a set of parabolas;
3. $\delta>0$, a set of hyperbolas.

Physically, $\delta$ includes the square of shearing deformation and the product of two components of the divergence. Because the square of shearing deformation is always greater or equal to zero, the only case when the $rV_d$ pattern holds an ellipse is when $u_x v_y > (u_y+v_x)^2/4$, which implies that $u_x v_y > 0$ is a necessary but not a sufficient condition.

When the wind field is linear, $rV_d$ and $V_d$ are mathematically identical and the mean wind, divergence and deformation may be deduced. For example, the geometric properties of the $rV_d$ patterns for linear wind fields can be used to determine the presence of a mean wind ($u_0$, $v_0$), which is equivalent to translating the $rV_d$ conic sections to a new origin ($x_0$, $y_0$) as follows:

$$x_0 = \frac{4}{[(u_y+v_x)^2 - 4u_x v_y]} \begin{vmatrix} \frac{1}{2}u_0 & \frac{1}{2}(u_y+v_x) \\ \frac{1}{2}v_0 & v_y \end{vmatrix} = \frac{[2u_0 v_y + (u_y+v_x)v_0]}{[(u_y+v_x)^2 - 4u_x v_y]} \quad (6)$$

$$y_0 = \frac{4}{[(u_y+v_x)^2 - 4u_x v_y]} \begin{vmatrix} u_x & \frac{1}{2}u_0 \\ \frac{1}{2}(u_y+v_x) & \frac{1}{2}v_0 \end{vmatrix} = \frac{[2u_x v_0 - (u_y+v_x)u_0]}{[(u_y+v_x)^2 - 4u_x v_y]} \quad (7)$$

The magnitude and sign (i.e., direction) of the $rV_d$ pattern translation depends on the values of the $u_0$ and $v_0$ and the linear wind field specified in Equations (6) and (7). In the $V_d$ framework, analysis is performed on rings centered at the radar. Hence, the linear wind fields have their centers at the radar and $u_0$ and $v_0$ are interpreted as "translation speed."

Geometrically, Equation (5) represents a general form of conic sections with an arbitrary orientation [if $(u_y+v_x)\neq 0$] that can be rotated to realign the primary axes with the x-axis and the y-axis. Mathematically, this is equivalent to performing a coordinate transformation by rotating a positive acute angle $\alpha$:

$$\alpha = \frac{1}{2}\tan^{-1}\frac{u_y + v_x}{u_x - v_y} \quad (8)$$

so that Equation (5) may be reduced to the form:

$$A(x-x_0)^2 + C(y-y_0)^2 = F \quad (9)$$

in the rotated coordinate system. It may further be shown that:

$$u_x + v_y = A + C. \quad (10)$$

A shearing deformation ($u_y+v_x\neq0$) rotates the major axes of the conic sections of the $rV_d$ pattern at an acute angle from the x- and the y-axes. The amount of rotation of the major axes is a function of the divergence, stretching deformation, and shearing deformation. While the resultant deformation (the square root of the sum of the square of shearing and stretching deformation) is invariant, the shearing deformation and stretching deformation are properties that are dependent on the coordinate system. The shearing deformation and stretching deformation may therefore be made to disappear by selecting a proper coordinate system (e.g., axis of dilatation). These properties of deformation may clearly be seen via Equations (5), (8), and (9). Similarly, the total divergence/convergence is invariant according to Equation (10).

The $rV_d$ framework therefore mathematically yields a simple and concise bivariate quadratic polynomial in a Cartesian coordinate for a linear, non-rotational wind field. The physical properties are intuitive to identify and interpret based on the straight-forward and well-known geometric relations between conic sections and quadratic equations. FIGS. 1a-8f provide examples of basic patterns between $V_d$ and $rV_d$ that illustrate the fundamental differences between these two quantities on wind fields.

FIGS. 1a-1f depict a set of two simple wind fields in which it may be seen that the atmospheric signatures displayed in $rV_d$ have several advantages over those displayed in $V_d$. A constant easterly mean wind is shown in FIG. 1a and its corresponding $V_d$ and $rV_d$ displays are illustrated in FIGS. 1b & 1c respectively. An axisymmetric vortex is shown in FIG. 1d and its corresponding $V_d$ and $rV_d$ displays are illustrated in FIGS. 1e & 1f respectively. The origin, located at 0, 0, indicates the position of the hypothetical Doppler radar. The x-axis and y-axis range from 0 to 120 km.

It should be appreciated that in generating the representations of kinematic wind structures depicted in FIGS. 1a-8d, the Doppler radar transmits a plurality of radar signals, which are reflected back towards the radar at given points in space. The radial component of the wind velocity at the reflected point generates a Doppler shift in the transmitted signal resulting in the calculated Doppler velocity $V_d$. Those skilled in the art will appreciate that data is collected at a plurality of gates (locations or pulse volumes) at various radii around the wind field.

From FIGS. 1a-c it may be seen that the signature of a constant wind (FIG. 1a) displayed in $V_d$ (FIG. 1b) is a starburst pattern. The signature of a constant wind represented in $rV_d$ (FIG. 1c) becomes a set of north-south-oriented parallel lines.

From FIGS. 1d-f, it may be seen that the signature of an axisymmetric atmospheric vortex (FIG. 1d) possesses geometric distortion due to the scanning characteristics of a ground-based Doppler radar in $V_d$ pattern (FIG. 1e). In particular, the Doppler velocity dipole is skewed toward the radar as a function of the distance from the radar to the vortex center accompanied by non-parallel constant $V_d$ lines inside the radius of maximum wind 102, represented by the dashed circle in FIGS. 1d-1f. The aforementioned geometric distortion for an axisymmetric vortex is no longer a factor displayed in the representation of $rV_d$ (FIG. 10.

FIGS. 2a1-8d depict a set of wind fields in which the 0,0 position is denoted by a "+" mark, indicating the position of the hypothetical Doppler radar. Each x-axis and y-axis range from −200 to 200 km. The "O" marks the center of the conic cross section of the $rV_D$ function. The major and minor axes 204 of the conic cross section of the $rV_d$ function are indicated by dotted lines.

Table 1 provides the parameters of the Cases illustrated in FIGS. 2a1-7c3. Table 2 provides descriptive names for each case listed in Table 1.

TABLE 1

| Case | $u_0$ (m/s) | $v_0$ (m/s) | $u_x$ (s$^{-1}$) | $u_y$ (s$^{-1}$) | $v_x$ (s$^{-1}$) | $v_y$ (s$^{-1}$) | $u_{xx}$ (m$^{-1}$s$^{-1}$) |
|---|---|---|---|---|---|---|---|
| A | 10 | 10 | 0 | 0 | 0 | 0 | 0 |
| B | 0 | 0 | 2E−4 | 0 | 0 | 1E−4 | 0 |
| C | 0 | 0 | 2E−4 | 0 | 0 | −1E−4 | 0 |
| D | 0 | 0 | 0 | 1E−4 | 1E−4 | 0 | 0 |
| BD | 0 | 0 | 2E−4 | 1E−4 | 1E−4 | 1E−4 | 0 |
| CD | 0 | 0 | 2E−4 | 1E−4 | 1E−4 | −1E−4 | 0 |
| AB | 10 | 10 | 2E−4 | 0 | 0 | 1E−4 | 0 |
| AC | 10 | 10 | 2E−4 | 0 | 0 | −1E−4 | 0 |
| AD | 10 | 10 | 0 | 1E−4 | 1E−4 | 0 | 0 |
| ABD | 10 | 10 | 2E−4 | 1E−4 | 1E−4 | 1E−4 | 0 |
| ACD | 10 | 10 | 2E−4 | 1E−4 | 1E−4 | −1E−4 | 0 |
| E1 | 0 | 0 | 0 | 0 | 0 | 0 | 3E−7 |
| E2 | 0 | 0 | 0 | 0 | 0 | 0 | 3E−6 |
| ABDE1 | 10 | 10 | 2E−4 | 1E−4 | 1E−4 | 1E−4 | 3E−7 |
| ABDE2 | 10 | 10 | 2E−4 | 1E−4 | 1E−4 | 1E−4 | 3E−6 |

TABLE 2

| Case | Descriptive name |
|---|---|
| A | Constant wind |
| B | Zero shearing deformation flow ($u_x v_y > 0$) |
| C | Zero shearing deformation flow ($u_x v_y < 0$) |
| D | Pure shearing deformation flow |
| BD | Mixed divergence ($u_x v_y > 0$) and shearing deformation flow |
| CD | Mixed divergence ($u_x v_y < 0$) and shearing deformation flow |
| AB | Zero shearing deformation flow ($u_x v_y > 0$) with constant wind |
| AC | Zero shearing deformation flow ($u_x v_y < 0$) with constant wind |
| AD | Pure shearing deformation flow with constant wind |
| ABD | Mixed divergence ($u_x v_y > 0$) and shearing deformation flow with constant wind |
| ACD | Mixed divergence ($u_x v_y < 0$) and shearing deformation flow with constant wind |
| E1 | Weak second order non-linear term |
| E2 | Strong second order non-linear term |
| ABDE1 | Mixed divergence ($u_x v_y > 0$), shearing deformation flow with constant wind, and weak non-linear flow |
| ABDE2 | Mixed divergence ($u_x v_y < 0$), shearing deformation flow with constant wind, and strong non-linear flow |

FIGS. 2a1-2a3 illustrate the wind vector field, $V_d$ and $rV_d$ displays of a uniform southwesterly wind, in accordance with an embodiment of the Application, Case A. When the velocity field is a constant [i.e., u(x, y)=$C_1$, v(x, y)=$C_2$, and V=$C_1$i+$C_2$j], Equation (4) becomes:

$$rV_d = u(x, y)x + v(x, y)y \quad (11)$$
$$= C_1 x + C_2 y$$

Equation (11) represents a set of parallel lines. Equation (2) may then reduce to:

$$\nabla(rV_d) = u(x, y)i + v(x, y)j \quad (12)$$
$$= C_1 i + C_2 j$$

A uniform southwesterly wind ($u_0=v_0=10$ m/s, Case A) is illustrated in FIG. 2a1. The corresponding $V_d$ holds a diverging (starburst) pattern centered at the radar (FIG. 2a2), while the $rV_d$ pattern possesses a set of parallel lines oriented from northwest to southeast (FIG. 2a3), perpendicular to the prescribed uniform southwesterly wind (FIG. 2a1). A wind direction 202, indicated by an arrow in FIG. 2a3, is pointing from negative to positive contours according to Equation (12). Although experienced radar scientists may identify the wind direction 202 and speed from FIG. 2a2, the $rV_d$ pattern is clearly more intuitive than the traditional $V_d$ display.

FIGS. 2b1-2b3 illustrate the wind vector field, $V_d$, and $rV_d$ displays of a zero shearing deformation flow ($u_x v_y > 0$) in accordance with an embodiment of the Application, Case B. Shearing deformation is dependent on coordinates. As will be explained below, the amount of rotation in the mathematic coordinate system of a given $rV_d$ pattern indicates the magnitude of shearing deformation.

When $u_y + v_x = 0$, the corresponding $rV_d$ patterns can be one of three non-degenerate quadratic curves (a special case of a parabola) depending on the sign and magnitude of $u_x$ and $v_y$. When $u_x$ and $v_y$ are both positive (e.g., $u_x=2v_y=$2E−4 s$^{-1}$, Case B), the wind vectors diverge from a singular point collocated with the radar (FIG. 2b1). The corresponding $rV_d$ patterns (FIG. 2b3) are concentric ellipses with positive contours, in accordance with Equation (5). In the example of Case B, the u gradient along the x-axis is twice the v gradient along the y-axis, so that the major axis 204 of the ellipse is along the y-axis. The $V_d$ pattern (FIG. 2b2) appears elliptical but it cannot be shown mathematically to be elliptical, as in $rV_d$, the $V_d$ pattern will be referred to as an ellipse-like curve hereafter.

In other embodiments, $u_x$ and $v_y$ may be negative. If $u_x$ and $v_y$ are both negative ($u_x<0$ and $v_y<0$; $u_x=2v_y=-2E-4$ s$^{-1}$), the wind vectors in FIG. 2$b$1 may be reversed in direction (i.e., pointing toward the radar at the origin) and the patterns remain the same as the set of ellipses found in FIGS. 2$b$2 and 2$b$3, but with negative contour values (not shown). In other embodiments, $u_x$ may be equal to $v_y$. In the special case that $u_x=v_y$, both $V_d$ and $rV_d$ contours of the aforementioned wind vector fields may be concentric circles (scaled differently) with positive (negative) contours representing a pure diverging (converging) flow (not shown).

In the embodiments discussed above with regards to a zero shearing deformation flow ($u_xv_y>0$), the major axis of the ellipse is aligned with either y-($|u_x|>|v_y|$) or x-($|u_x|<|v_y|$) axis.

FIGS. 2$c$1-2$c$3 illustrate the wind vector field, $V_d$, and $rV_d$ displays of a zero shearing deformation flow ($u_xv_y<0$) in accordance with an embodiment of the Application, Case C. In the example embodiment of case C, $u_x$ and $v_y$ have opposite signs (e.g., $u_xv_y<0$, $u_x=-2v_y=2E-4$ s$^{-1}$). The corresponding vector field is illustrated in FIG. 2$c$1. The $V_d$ and $rV_d$ patterns of the flow of Case C include a set of hyperbola-like curves and hyperbola (FIGS. 2$c$2 and 2$c$3). In the example of Case C, $u_x>0$. A positive value for $u_x$ provides a set of East-West opening hyperbola with positive $V_d$ and $rV_d$ contours along the opening of the hyperbola. In other embodiments, a positive value for $v_y$ represents a set of North-South opening hyperbola with negative $V_d$ and $rV_d$ contours along the opening of the hyperbola.

In embodiments, $u_x$ or $v_y$ may vanish in the zero shearing deformation flow, resulting in a $rV_d$ pattern that is a set of parallel lines (i.e., a special case of parabola when $\delta=0$). When $u_x=0$, the $rV_d$ lines parallel the x-axis, and when $v_y=0$, the $rV_d$ lines parallel the y-axis.

In the embodiments discussed above with regards to zero shearing deformation flow cases, the major and minor axes are aligned along either the x- or the y-axis.

FIGS. 2$d$1-2$d$3 illustrate the wind vector field, $V_d$ and $rV_d$ displays of a pure shearing deformation flow in accordance with an embodiment of the Application, Case D. When $u_x=v_y=0$ and $u_y+v_x\neq0$, the $rV_d$ pattern possesses a set of rectangular hyperbola with horizontal (x-axis) and vertical (y-axis) asymptotes and the $V_d$ pattern possesses a set of hyperbola-like curves similar to $rV_d$. For example, the wind vectors of shearing deformation (e.g., $u_y+v_x>0$, $u_y=v_x=E-4$ s$^{-1}$, $u_x=v_y=0$, Case D) and the corresponding $V_d$ and $rV_d$ patterns are illustrated in FIGS. 2$d$1, 2$d$2 and 2$d$3, respectively.

In the embodiments discussed with regards to pure shearing deformation flow, the major axes 204 of the rectangular hyperbola or the hyperbola-like curves now are rotated 45° from either x- or y-axis compared to the zero shearing deformation flow cases. In other embodiments, when $u_y+v_x<0$, the $V_d$ and $rV_d$ patterns are conjugate of the pattern illustrated in FIGS. 2$d$2 and 2$d$3 (not shown).

In the example embodiment of case D, the geometry of the rectangular hyperbola depends only on the magnitude and the sign of $u_y+v_x$, not on the individual magnitude and/or signs of $u_y$ and $v_x$ as in the zero shearing deformation flow fields discussed above. For a given $u_y+v_x$ (i.e., shearing deformation), different combinations of $u_y$ and $v_x$ yield the same $V_d$ and $rV_d$ patterns, respectively. As a result, it is not possible to separate $u_y$ and $v_x$ for a given wind field. It therefore may not be possible to unambiguously deduce vorticity to retrieve the full linear wind field from an observed $rV_d$ pattern even when $u_x$ and $v_y$ are uniquely distinguished.

The above-discussion of the properties of Cases A, B, C, and D are in no way intended to be limiting. The basic $rV_d$ patterns associated with Cases A, B, C, and D form four basic building blocks for interpreting further, more complicated linear flow fields which are further contemplated by this Application. For example, Cases A, B, C, and D may be used to build more complicated combinations of $u_x$, $u_y+v_x$, and $v_y$ from Equation (11). Based on Equation (5), the combined $rV_d$ pattern (ellipse, parabola, or hyperbola) and features of a corresponding wind field (i.e., the relative magnitude between shearing deformation, stretching deformation and divergence) may be determined from the sign of $\delta$.

The following two examples provided in FIGS. 3$a$1-3$bc$ illustrate the flow fields by combining zero and pure shearing deformation flows using the building blocks of Cases A, B, C, and D.

FIGS. 3$a$1-3$a$3 illustrate the wind vector field, $V_d$ and $rV_d$ displays of a mixed divergence ($u_xv_y>0$) and shearing deformation flow in accordance with an embodiment of the Application, Case BD. The first flow field (FIG. 3$a$1, Case BD) is constructed by superimposing the zero shearing deformation flow (FIG. 2$b$1, $u_x=2v_y=2E-4$ s$^{-1}$, Case B) and the pure shearing deformation flow (FIG. 2$d$1, $u_y=v_x=E-4$ s$^{-1}$, Case D) with the resulting $V_d$ and $rV_d$ patterns portrayed in FIGS. 3$a$2 and 3$a$3. As predicted from Equations (5) and (8), the primary axes 204 of the $rV_d$ pattern illustrated in FIG. 3$a$3 rotate counterclockwise at an acute angle of 31.7°. The $V_d$ pattern (FIG. 3$a$2) rotates the same magnitude as the $rV_d$ pattern but the shape is a distorted ellipse-like curve. The $rV_d$ pattern maintains the elliptical shape because the determinant $\delta$ of Equation (5) is less than zero in this case.

In other embodiments, if the flow matches the condition of $u_yv_x=(u_y+v_x)^2/4$, then the $rV_d$ pattern becomes a set of straight lines (degenerate parabola with two identical real solutions, not shown). In other embodiments, if the combination of zero and pure shearing deformation flows makes $\delta>0$, then the $rV_d$ pattern becomes hyperbola (not shown).

FIGS. 3$b$1-3$b$3 illustrate the wind vector field, $V_d$ and $rV_d$ displays of a mixed divergence ($u_xv_y<0$) and shearing deformation flow in accordance with an embodiment of the Application, Case CD. The second flow field (FIG. 3$b$1, Case CD) is constructed by superimposing the zero shearing deformation flow (FIG. 2$c$1, $u_x=-2v_y=2E-4$ s$^{-1}$, Case C) and the pure shearing deformation flow (FIG. 2$d$1, $u_y=v_x=E-4$ s$^{-1}$, Case D) with the resulting $V_d$ and $rV_d$ patterns portrayed in FIGS. 3$b$2 and 3$b$3. This is the case where $\delta$ is always greater than 0 when $u_x$ and $v_y$ have opposite signs. The characteristics of this set of $V_d$, and $rV_d$ patterns are very similar to the previous example in FIG. 3$a$ with a set of hyperbola and hyperbola-like curves rotated 16.8° counterclockwise as predicted by Equation (8).

The examples of FIGS. 3$a$1-3$b$3 demonstrate that the $rV_d$ signature of pure linear wind field is cleaner than the $V_d$ signature, a clear advantage in displaying Doppler velocity in the $rV_d$ framework.

As previously discussed, the presence of background constant winds, $u_0$ and $v_0$, geometrically translate the center of basic conic sections displayed in $rV_d$ from (0, 0) to ($x_0$, $y_0$) where the magnitude and sign (i.e., direction) of the $rV_d$ pattern translation depend on the characteristics of the background flow and the linear wind field specified in Equations (6) and (7). The three examples provided in FIGS. 4$a$1-4$c$3 illustrate the wind fields and the characteristics of $V_d$ and $rV_d$ of the linear wind fields portrayed in FIG. 2$b$-2$d$ superimposed on a constant southwesterly background wind (FIG. 2$a$, $u_0=v_0=10$ m/s).

FIGS. 4a1-4a3 illustrate the wind vector field, $V_d$, and $rV_d$ displays of a zero shearing deformation flow ($u_xv_y>0$) with constant wind in accordance with an embodiment of the Application, Case AB. Superimposing a zero shearing deformation flow when $u_xv_y>0$ ($u_x>0$ and $v_y>0$; $u_x=2v_y=2E-4$ s$^{-1}$, FIG. 2b1, Case B) onto the southeasterly background mean flow (FIG. 2a1, Case A) shifts the flow center toward the southwest into the wind (FIG. 4a1, Case AB) compared to FIG. 2b1. As previously discussed, the $V_d$ and $rV_d$ patterns of a zero shearing deformation flow form similar concentric ellipse-like curves and ellipses (FIGS. 2b2 and 2b3). As may be seen from FIG. 4a2, although the $V_d$ display shifts to the same center as in $rV_d$, it has lost its original shape with only a hint of the ellipse-like pattern remaining. As may be seen from FIG. 4a3, however, when a constant background flow presents, $rV_d$ patterns conserve their original concentric ellipses, but the center is shifted to (−25 km, −50 km) as predicted by Equations (6) and (7).

FIGS. 4b1-4b3 illustrate the wind vector field, $V_d$ and $rV_d$ displays of a zero shearing deformation flow ($u_xv_y<0$) with constant wind in accordance with an embodiment of the Application, Case AC. If the zero shearing deformation flow of $u_xv_y<0$ ($u_x>0$ and $v_y<0$; $u_x=-2v_y=2E-4$ s$^{-1}$, FIG. 2c1, Case C) is superimposed onto the southwesterly background flow (FIG. 2a1, Case A), the center of the wind pattern shifts to the northwest (FIG. 4b1, Case AC). As may be seen in FIG. 4b2, the corresponding $V_d$ pattern is a set of distorted hyperbola-like curves. As may be seen from FIG. 4b3, however, the $rV_d$ pattern of this wind field remains a set of hyperbola with a new center at (−25 km, 50 km), as predicted by Equations (6) and (7).

FIGS. 4c1-4c3 illustrate the wind vector field, $V_d$ and $rV_d$ displays of a zero shearing pure flow with constant wind in accordance with an embodiment of the Application, Case AD. As may be seen from FIG. 4c2, when the constant southwesterly wind (FIG. 2a1, Case A) is superimposed on the pure shearing deformation field ($u_y+v_x>0$, $u_y=v_x=E-4$ s$^{-1}$, $u_x=v_y=0$, FIG. 2d1, Case D), the $V_d$ display becomes a set of distorted hyperbola-like curves. As may be seen from FIG. 4c3, however, the $rV_d$ pattern maintains its hyperbola characteristics and shifts to a new center at (−50 km, −50 km), as predicted by Equations (6) and (7)

The two examples provided in FIGS. 5a1-5b3 illustrate mixed linear wind fields (FIG. 3a1, Case BC and FIG. 3b1, Case BD) superimposed onto the constant background flow (FIG. 2a1, Case A). FIGS. 5a1-5a3 illustrate the wind vector field, $V_d$ and $rV_d$ displays of a mixed divergence ($u_xv_y>0$) and shearing deformation flow with constant wind in accordance with an embodiment of the Application, Case ABD. FIGS. 5b1-5b3 illustrate the wind vector field, $V_d$ and $rV_d$ displays of a mixed divergence ($u_xv_y<0$) and shearing deformation flow with constant wind in accordance with an embodiment of the Application, Case ACD.

In the resulting wind fields (FIGS. 5a1 and 5b1), the general characteristics of the $V_d$ (FIGS. 5a2 and 5b2) and $rV_d$ patterns (FIGS. 5a3 and 5b3) are very similar to those shown in simple linear wind fields (FIGS. 4a-4c) where the distortion in the $V_d$ patterns (FIGS. 5a2 and 5b2) is apparent while the basic patterns of the $rV_d$ (FIGS. 5a3 and 5b3) are conserved with a translation. The centers in $rV_d$ patterns were shifted to (0 km, −50 km) and (−33.3 km, 16.7 km) according to Equations (6) and (7), respectively.

In all of Cases AB, AC, AD, ABD, and ACD described above, the zero $V_d$ and $rV_d$ contours are invariant according to definition, and are unaffected by coordinate transformation. In other words, one of the zero contours must pass through the radar at (0, 0) by definition.

From the examples provided in the constant background wind embodiments of FIGS. 4a1-5b3, it may be seen that there is a clear advantage to displaying the Doppler velocity in $rV_d$ rather than $V_d$ for interpretation and operational purposes because $rV_d$ patterns are conserved in the presence of a constant background flow so that the flow characteristics can be more easily deduced than with conventional $V_d$ displays.

In addition to using $rV_d$ to construct linear wind fields, non-linear wind fields may also be constructed by including the second order derivatives in the velocity fields as shown in Equation (4). The second-order non-linear wind field possesses a cubic polynomial in the $rV_d$ framework. The graphical expression of a cubic polynomial is complicated, however, and the resulting $rV_d$ patterns may not be as straightforward to recognize as those of the quadratic equation, with the exception for a few simple flow patterns. It may be further seen from Equation (4) that much like the quadratic equation, for a cubic polynomial several second-order derivatives are grouped together. For a non-linear wind field, it may therefore be impossible to determine the individual second-order derivatives unambiguously. Examples of both weak and strong simple nonlinear wind fields with only one non-linear term, $u_{xx}\neq 0$, (Cases E1 and E2) are superimposed onto the linear wind field illustrated in FIG. 5a1 (Case ABD) in FIG. 6.

FIGS. 6a1-6a3 illustrate the wind vector field, $V_d$, and $rV_d$ displays of a mixed divergence ($u_xv_y>0$) and shearing deformation flow with constant wind in a weak order non-linear field in accordance with an embodiment of the Application, Case ABDE1. As may be seen form FIGS. 6a2 and 6a3, the resulting $V_d$ and $rV_d$ patterns in a weak non-linear field are similar to those of the linear cases (FIGS. 5a2 and 5a3).

FIGS. 6b1-6b3 illustrate the wind vector field, $V_d$ and $rV_d$ displays of shows mixed divergence and shearing ($u_xv_y<0$) deformation flow with constant wind in a strong order non-linear field in accordance with an embodiment of the Application, Case ABDE2. The strong non-linear term in example Case ABDE2 is ten times the weak non-linear term found in example Case ABDE1. In the case of the strong nonlinear wind field, the $V_d$ and $rV_d$ patterns (FIGS. 6b2 and 6c2) hardly possess any of the features found in the original linear patterns $V_d$ and $rV_d$ (FIGS. 5a2 and 5a3). In general, the characteristics of other linear wind fields, when mixed with second-order non-linear wind fields (not shown), may be similar to the examples shown in FIG. 6.

A Taylor series expansion may be conducted to third- and higher-orders, but the graphical characteristics possess only limited applications in practice. Nevertheless, the $rV_d$ display can be used to determine the degree of linearity of the underlying wind field, a valuable tool to assess the validity of the properties deduced by the VAD for both research and operational purposes.

As described above, linear and non-linear wind fields may be represented as polynomials in the $rV_d$ framework whose coefficients link to the flow characteristics and/or their combinations. For a given $rV_d$ pattern a subset of flow characteristics may be estimated qualitatively. Quantitative information about a given wind field (i.e., coefficients of the polynomial) may be obtained via the least-squares fit method or the derivative method.

FIGS. 7a1-7c3 illustrate the results of quantitative DVAD analysis of the prescribed linear wind field with noise in accordance with an embodiment of the Application. FIGS. 7a1-7a3 illustrate the wind vector field, $V_d$, and $rV_d$ displays of Case ABD. In order to test the sensitivity of the two methods to random noise in the observations, a 2 m/s random noise was added to a linear wind field including a mixture of a background mean wind, diverging flow and deformation flow. The random noise added to Case ABD represents an approximate 10% uncertainty. The corresponding $V_d$ and $rV_d$ displays are respectively illustrated in FIGS. 7a2 and 7a3, and resemble their noise-free equivalent counterparts from FIGS. 5a2 and 5a3.

A quantitative $rV_d$ analysis may be performed via a least-squares fit. The least-squares fit method is a standard approach that has been used in many single-Doppler wind retrieval algorithms. The details, which are well known to those skilled in the art, will not be repeated here. Using the least-squares fit method to acquire quantitative information about a wind field from $rV_d$ data is contemplated by this Application.

The quantitative $rV_d$ analysis may also be performed via successive differentiation of Equation (5) with respect to x and y to deduce coefficients. Each successive differentiation eliminates the lowest-order terms from the previous set of equations so that eventually the highest-order derivatives emerge and the lower-order derivatives vanish. This property of the derivative method illustrates another advantage of using $rV_d$ over those $V_d$-based single-Doppler wind retrieval algorithms operating in the polar coordinate system.

The successive differentiation method may be illustrated by using the bivariate quadratic polynomial in Equation (5). By taking the derivative of Equation (5) with respect to x and y, the following is obtained:

$$\frac{\partial (rV_d)}{\partial x} = 2u_x x + (u_y + v_x)y + u_0 \quad (13)$$

$$\frac{\partial (rV_d)}{\partial y} = 2v_y y + (u_y + v_x)x + v_0 \quad (14)$$

By evaluating Equations (13) and (14) at the origin (x=y=0), we obtain $u_0$ and $v_0$ as shown in (2). By further taking the derivative of Equations (13) and (14) with respect to x and y, the following three independent equations are obtained:

$$\frac{\partial^2 (rV_d)}{\partial x^2} = 2u_x \quad (15)$$

$$\frac{\partial^2 (rV_d)}{\partial x \partial y} = u_y + v_x \quad (16)$$

$$\frac{\partial^2 (rV_d)}{\partial y^2} = 2v_y \quad (17)$$

In a linear wind field, Equations (15)-(17) are constant by definition. Hence the coefficients $u_x$, $(u_y+v_x)$ and $v_y$ may be obtained. The coefficients $u_0$ and $v_0$ may also be obtained within the entire domain by evaluating Equations (13) and (14) using Equations (15)-(17). If the wind field is non-linear, then Equations (15)-(17) will not be constant. Equations (13)-(17) may be accurate in the vicinity of the radar, however.

Coefficients for higher-order polynomials may be obtained in a similar manner with the derivative method in theory. Taking the derivatives of a field is much simpler than performing a 2-D least squares curve fit. However, the derivative method may amplify local noise with each successive differentiation. Therefore, in order to apply the derivative method to real data, the 2-D field of $rV_d$ and subsequent derivatives of $rV_d$ may need to be filtered or smoothed before each differentiation. Filtering or smoothing $rV_d$ data is contemplated by this Application, using algorithms commonly known to those who are skilled in the art.

The results of applying a least squares fit and successive differentiation method to the wind field represented by FIG. 7a1 (Case ABD with noise) are summarized in Table 3. Table 3 also includes the true coefficients of the linear wind field that represents Case ABD for comparison.

TABLE 3

| | $u_0$ (m/s) | $v_0$ (m/s) | $u_x$ (s$^{-1}$) | $v_y$ (s$^{-1}$) | $u_y + v_x$ (s$^{-1}$) |
|---|---|---|---|---|---|
| True | 10 | 8 | 0.1 | 0.1 | 0.02 |
| Fitting | 11 | 9 | 0.1 | 0.1 | 0.02 |
| Derivative | 11 | 8.9 | 0.095 | 0.106 | 0.02 |

It may be concluded from Table 3 that both the least-squares fit and derivative methods yield almost identical results. The retrieved $u_0$ and $v_0$ are within 10% of the true field while the three linear terms are nearly identical to the true values. The least-squares fit method is not sensitive to the random noise. The graphical representation of the deduction in Equations (13)-(17) is depicted in FIG. 7b1-7c3. According to Equations (13)-(14), for a linear wind field, the first derivative of $rV_d$ with respect to x and y should be two sets of parallel lines as illustrated in FIGS. 7b1 and 7c1 while the second derivative (Equations (15)-(17)) should be constant as illustrated in FIGS. 7b2, 7b3, 7c2, and 7c3. It may be concluded from FIGS. 7b1-7c3 that the derivative method is still applicable when noise is presented in data. The results may be improved upon with the application of proper filtering to the intermediate results, however.

Figure 8D:
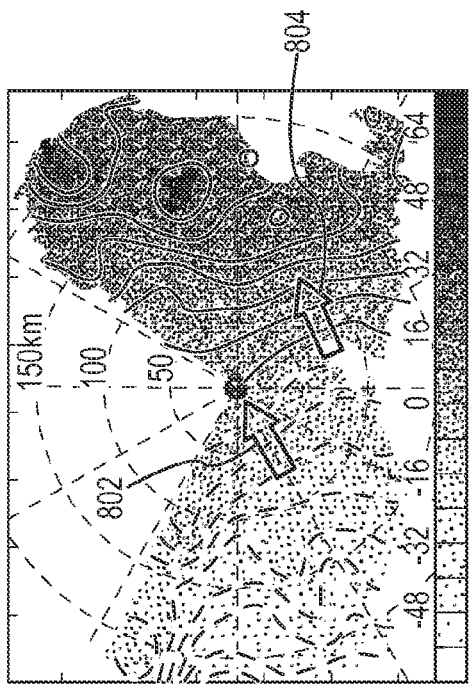
Figure 8A:
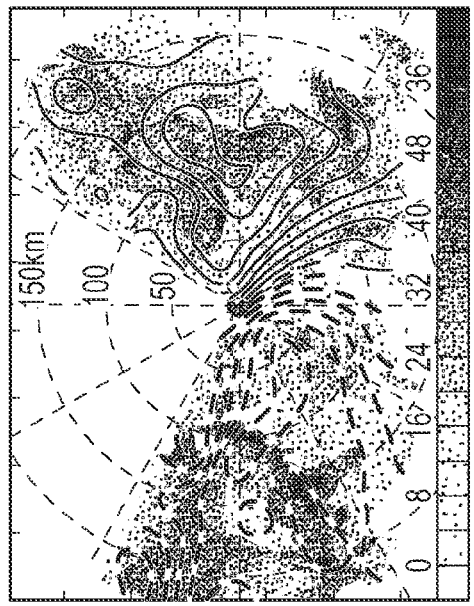
FIG. 8a shows s-band Doppler radar reflectivity observations in shading overlaid with corresponding observed Doppler velocity contours.
Figure 8C:
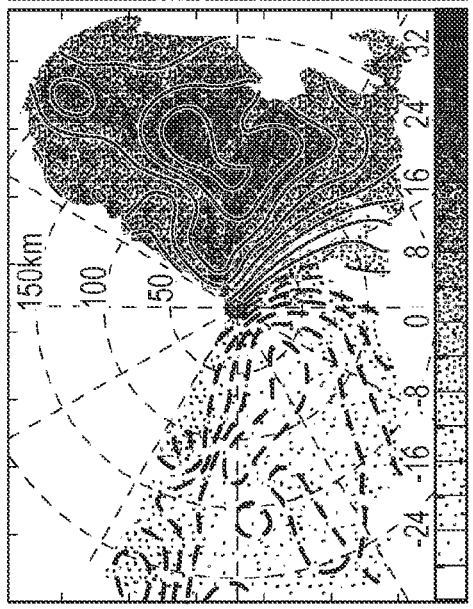

In FIGS. 8a-d, the results of using a graphical interpretation of real winds using DVAD analysis may be seen, in accordance with an embodiment of the Application. FIGS. 8a-d depict a squall line that approached southern Taiwan on 7 Jun. 2003, as observed by an S-band Doppler radar (RCKT) operated by the Central Weather Bureau of Taiwan. FIGS. 8a and 8b depict the RCKT 0.5° reflectivity PPI overlaid with in shading with $V_d$ and $rV_d$ contours, respectively. FIG. 8c depicts $V_d$ in shading and contours. FIG. 8d depicts $rV_d$ in shading with contours. A wedge between 300° and 30° azimuth in FIGS. 8a-8d was blocked by terrain in southern Taiwan.

The application of $rV_d$ to graphically interpret the real, near-surface, flow pattern from low elevation angle single-Doppler radar PPI observations is portrayed by an example involving two mesoscale convective systems (MCSs). The target squall line was located approximately 100 km west of the RCKT, and a second MCS was located approximately 50 km east of RCKT.

An experienced radar meteorologist may be able to identify a general southwesterly wind ahead of the squall line and a general westerly jet behind the squall line based on the distribution of $V_d$ (FIGS. 8a and 8c). For example, the convergence along the southern part of the squall line is indicated by a weak $V_d$ contour followed by stronger $V_d$ behind the line. The squall line and MCS flow characteristics are clearer and more intuitive in the $rV_d$ display (FIGS. 8b and 8d), however. In FIGS. 8b and 8d, the general flow directions are clear, as indicated by a first flow arrow 802 and a second flow arrow 804. Relatively uniform flow fields are represented by localized near parallel straight contours of $rV_d$, such as to the southeast of RCKT. For example, the southwesterly winds southwest of the RCKT become west-southwesterly winds to the east of the RCKT, where the winds approached the back side of the MCS. The location of the target squall line (indicated by high reflectivity) is accompanied by curved $rV_d$ contours, indicating a non-uniform wind shift across the squall line. The $rV_d$ contours were also curved within the MCS, but the curvature was not as steep as that within the squall line. This region of curved $rV_d$ contours along the squall line is a region of convergence between northwesterly (behind the line) and southerly (ahead of the line).

Figure 9:
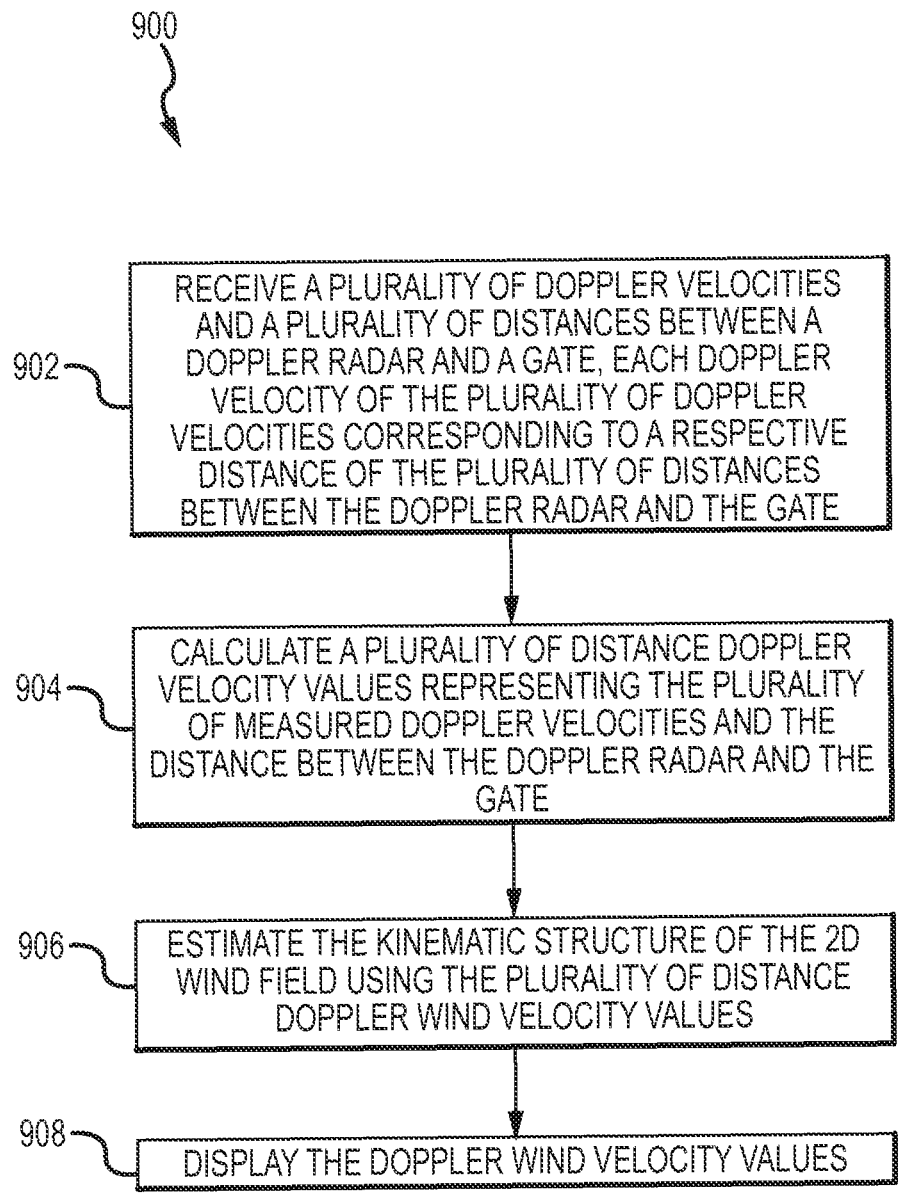
FIG. 9 shows a flowchart of a method for determining a kinematic structure of a two-dimensional wind field in accordance with an embodiment of the present Application.

FIG. 9 depicts a flowchart 900 of a method for determining a kinematic structure of a two-dimensional wind field in accordance with an embodiment of the present Application. Flowchart 900 begins with step 902. In step 902, a plurality of Doppler velocities and a plurality of distances between a Doppler radar and a gate are received. Each Doppler velocity of the plurality of Doppler velocities corresponds to a respective distance of the plurality of distances between the Doppler radar and the gate.

The next step in flowchart 900 is step 904. In step 904, a plurality of distance Doppler velocity values are calculated representing the plurality of measured Doppler velocities, and the distance between the Doppler radar and the gate. The Doppler velocities may be acquired with techniques and equipment commonly known to those in the art. The distance between the Doppler radar and gate may similarly be calculated using techniques well known in the art.

The next step in flowchart 900 is step 906. In step 906, the kinematic structure of the 2D wind field is estimated using the plurality of distance Doppler wind velocity values. For example, techniques described in this Application may be used to determine the kinematic structure of the 2D wind field.

The next step in flowchart 900 is step 908. In step 908, the Doppler wind velocity values are displayed. For example, the Doppler wind velocity values may be displayed via contour lines or shading, similar to the displays of Doppler wind velocity found in FIGS. 1-8. The Doppler wind velocity values may furthermore be displayed using any other type of radar display commonly known to those in the art.

Figure 10:
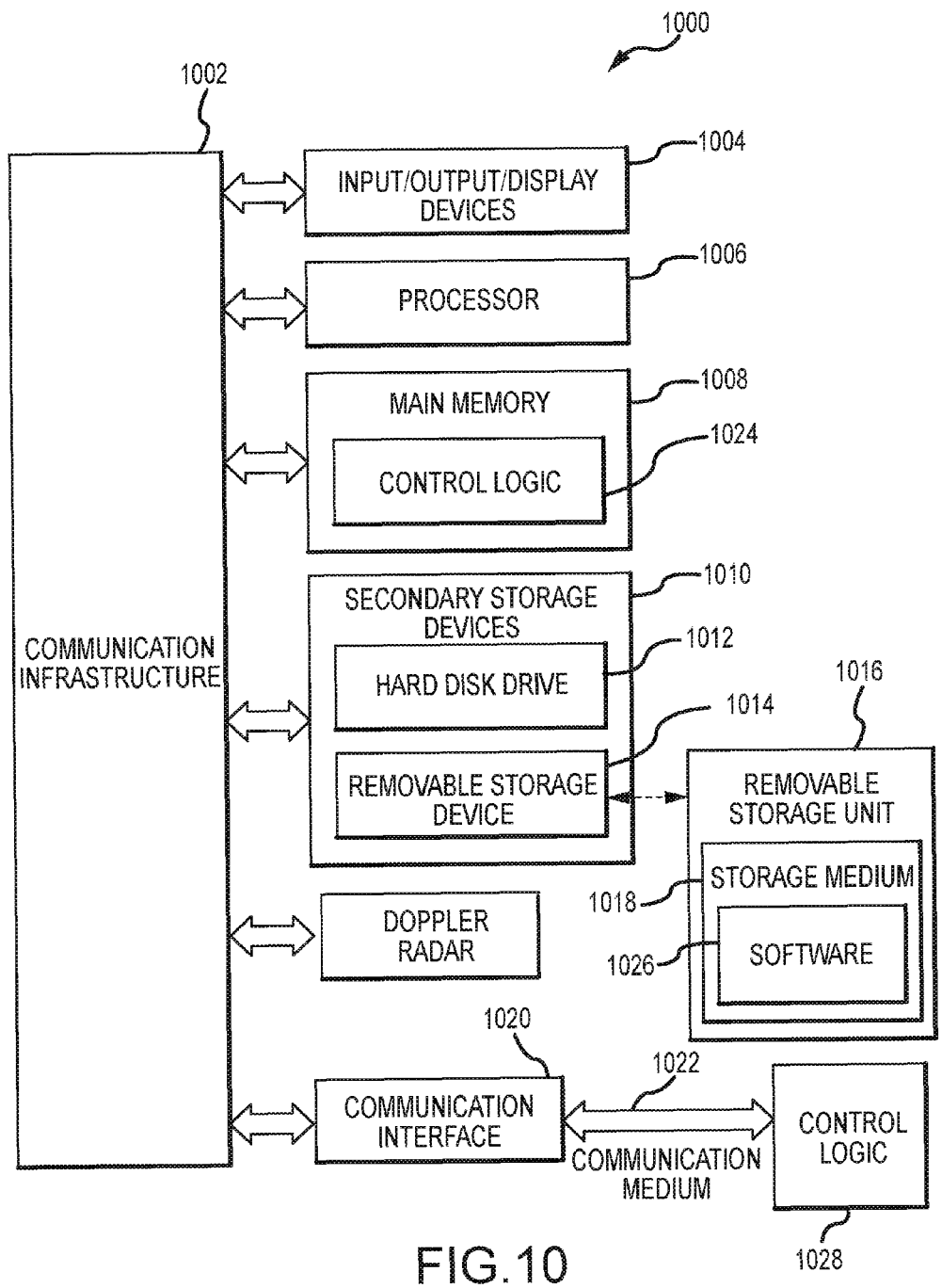
FIG. 10 shows a block diagram of an example computer system in which embodiments of the present Application may be implemented.

FIG. 10 shows a block diagram of an example computer 100 in which embodiments of the present Application may be implemented. The embodiments described herein, including systems, methods/processes, and/or apparatuses, may be implemented using well known servers/computers, such as computer 1000 shown in FIG. 10.

Computer 1000 can be any commercially available and well known computer capable of performing the functions described herein, such as computers available from International Business Machines, Apple, Sun, HP, Dell, Cray, etc. Computer 1000 may be any type of computer, including a desktop computer, a server, etc.

As shown in FIG. 10, computer 1000 includes one or more processors (e.g., central processing units (CPUs)), such as processor 1006. Processor 1006 may perform any of the steps described in the generation of FIGS. 1a1-8d, in flowchart 900, or any other calculation, estimation, or numerical method described in this Application herein. Processor 1006 is connected to a communication infrastructure 1002, such as a communication bus. In some embodiments, processor 1006 can simultaneously operate multiple computing threads.

Computer 1000 also includes a primary or main memory 1008, such as a random access memory (RAM). Main memory has stored therein control logic 1024 (computer software), and data.

Computer 1000 also includes one or more secondary storage devices 1010. Secondary storage devices 1010 include, for example, a hard disk drive 1012 and/or a removable storage device or drive 1014, as well as other types of storage devices, such as memory cards and memory sticks. For instance, computer 1000 may include an industry standard interface, such as a universal serial bus (USB) interface for interfacing with devices such as a memory stick. Removable storage drive 1014 represents a floppy disk drive, a magnetic tape drive, a compact disk drive, an optical storage device, tape backup, etc.

Removable storage drive 1014 interacts with a removable storage unit 1016. Removable storage unit 1016 includes a computer useable or readable storage medium 1018 having stored therein computer software 1026 (control logic) and/or data. Removable storage unit 1016 represents a floppy disk, magnetic tape, compact disc (CD), digital versatile disc (DVD), Blue-ray disc, optical storage disk, memory stick, memory card, or any other computer data storage device. Removable storage drive 1014 reads from and/or writes to removable storage unit 1016 in a well-known manner.

Computer 1000 also includes input/output/display devices 1004, such as monitors, keyboards, pointing devices, etc.

Computer 1000 further includes a communication or network interface 1020. Communication interface 1020 enables computer 1000 to communicate with remote devices. For example, communication interface 1020 allows computer 1000 to communicate over communication networks or mediums 1022 (representing a form of a computer useable or readable medium), such as local area networks (LANs), wide area networks (WANs), the Internet, etc. Network interface 1020 may interface with remote sites or networks via wired or wireless connections. Examples of communication interface 1022 include but are not limited to a modem, a network interface card (e.g., an Ethernet card), a communication port, a Personal Computer Memory Card International Association (PCMCIA) card, etc.

Control logic 1028 may be transmitted to and from computer 1000 via the communication medium 1022.

Any apparatus or manufacture comprising a computer useable or readable medium having control logic (software) stored therein is referred to herein as a computer program product or program storage device. This includes, but is not limited to, computer 1000, main memory 1008, secondary storage devices 1010, and removable storage unit 1016. Such computer program products, having control logic stored therein that, when executed by one or more data processing devices, cause such data processing devices to operate as described herein, represent embodiments of the Application.

The detailed descriptions of the above embodiments are not exhaustive descriptions of all embodiments contemplated by the inventors to be within the scope of the Application. Indeed, persons skilled in the art will recognize that certain elements of the above-described embodiments may variously be combined or eliminated to create further embodiments, and such further embodiments fall within the scope and teachings of the Aapplication. It will also be apparent to those of ordinary skill in the art that the above-described embodiments may be combined in whole or in part to create additional embodiments within the scope and teachings of the Application.

We claim:

1. A method for determining a kinematic structure of a two-dimensional (2D) wind field, comprising the steps of:
    transmitting a plurality of pulses with a Doppler radar;

receiving the plurality of pulses with the Doppler radar, and measuring a plurality of Doppler velocities and a plurality of distances between the Doppler radar and a gate with a processor, each Doppler velocity of the plurality of Doppler velocities corresponding to a respective distance of the plurality of distances between the Doppler radar and the gate;

calculating a plurality of distance Doppler velocity values representing:
  the plurality of measured Doppler velocities, and
  the respective distances between the Doppler radar and the gate;

estimating the kinematic structure of at least one of a 2D linear and a 2D non-linear wind field using a constant altitude plan of the plurality of distance Doppler wind velocity values, wherein the estimating includes estimating at least one of a constant wind background, a divergence, a shearing deformation, a stretching deformation, and a deformation of the 2D wind field by differentiating the plurality of distance Doppler wind velocity values;

generating a graphical representation of the kinematic structure of the 2D wind field comprising a grid, wherein a wind vector is derived for each grid intersection point; and displaying at least one of the Doppler wind velocity values and the graphical representation of the kinematic structure of the graphical representation of the kinematic structure of the 2D wind field.

2. The method of claim 1, wherein the kinematic structure of the 2D wind field estimated using the plurality of distance Doppler wind velocity values includes linear features.

3. The method of claim 1, wherein the kinematic structure of the 2D wind field estimated using the plurality of distance Doppler wind velocity values includes non-linear features.

4. The method of claim 1, wherein estimating the kinematic structure of the 2D wind field using the plurality of distance Doppler wind velocity values further includes estimating a constant background wind from a translation of a conic section of the plurality of distance Doppler wind velocity values from the Doppler radar.

5. The method of claim 1, wherein estimating the kinematic structure of the 2D wind field using the plurality of distance Doppler wind velocity values further includes estimating at least one of a divergence, a shearing deformation, a stretching deformation, and a deformation of the 2D wind field from a conic section of the plurality of distance Doppler wind velocity values.

6. The method of claim 1, wherein estimating the kinematic structure of the 2D wind field using the plurality of distance Doppler wind velocity values further includes estimating a shearing deformation of the 2D wind field from an angle required to align a primary axis of a conic section of the plurality of distance Doppler wind velocity values with an x-axis or a y-axis of a graphic representation of the plurality of distance Doppler wind velocity values.

7. The method of claim 1, wherein estimating the kinematic structure of the 2D wind field using the plurality of distance Doppler wind velocity values further includes estimating a shearing deformation of the 2D wind field by performing a least squares fit on the plurality of distance Doppler wind velocity values.

8. The method of claim 1, wherein estimating the kinematic structure of the 2D wind field using the plurality of distance Doppler wind velocity values includes estimating a non-linear feature of the 2D wind field by successively differentiating the plurality of distance Doppler wind velocity values.

9. The method of claim 1, wherein differentiating the plurality of distance Doppler wind velocity values further includes filtering noise from the plurality of distance Doppler wind velocity values.

10. A system for determining a kinematic structure of a two-dimensional (2D) wind field, comprising:
  a Doppler radar configured to transmit and receive a plurality of pulses;
  a computing device comprising a processor in communication with the Doppler radar, wherein the processor is configured to: measure a plurality of Doppler velocities and a plurality of distances between a Doppler radar and a gate, each Doppler velocity of the plurality of Doppler velocities corresponding to a respective distance of the plurality of distances between the Doppler radar and the gate; calculate a plurality of distance Doppler velocity values representing the plurality of measured Doppler velocities, and the respective distances between the Doppler radar and the gate; estimate the kinematic structure of at least one of a 2D linear and a 2D non-linear wind field using a constant altitude plan of the plurality of distance Doppler wind velocity values and generate a graphical representation of the kinematic structure of the 2D wind field, wherein the processor is configured to estimate the kinematic structure of the 2D wind field by estimating at least one of a constant wind background, a divergence, a shearing deformation, a stretching deformation, and a deformation of the 2D wind field by differentiating the plurality of distance Doppler wind velocity values; and
  a display device configured to display at least one of the Doppler wind velocity values and the kinematic structure of the 2D wind field, wherein the display comprises a grid, wherein a wind vector is derived for each grid intersection point.

11. The system of claim 10, wherein the kinematic structure of the 2D wind field estimated using the plurality of distance Doppler wind velocity values includes linear features.

12. The system of claim 10, wherein the kinematic structure of the 2D wind field estimated using the plurality of distance Doppler wind velocity values includes non-linear features.

13. The system of claim 10, wherein the processor is further configured to estimate the kinematic structure of the 2D wind field using the plurality of distance Doppler wind velocity values by estimating a constant background wind from a translation of a conic section of the plurality of distance Doppler wind velocity values from the Doppler radar.

14. The system of claim 10, wherein the processor is further configured to estimate the kinematic structure of the 2D wind field using the plurality of distance Doppler wind velocity values by estimating at least one of a divergence, a shearing deformation, a stretching deformation, and a deformation of the 2D wind field from a conic section of the plurality of distance Doppler wind velocity values.

15. The system of claim 10, wherein the processor is further configured to estimate the kinematic structure of the 2D wind field using the plurality of distance Doppler wind velocity values by estimating a shearing deformation of the 2D wind field from an angle required to align a primary axis of a conic section of the plurality of distance Doppler wind velocity values with an axis of a graphic representation of the plurality of distance Doppler wind velocity values.

16. The system of claim 10, wherein the processor is further configured to estimate the kinematic structure of the 2D wind field using the plurality of distance Doppler wind velocity values by estimating a shearing deformation of the 2D wind field by performing a least squares fit on the plurality of distance Doppler wind velocity values.

17. The system of claim 10, wherein the processor is configured to estimate the kinematic structure of the 2D wind field using the plurality of distance Doppler wind velocity values by estimating a non-linear feature of the 2D wind field by successively differentiating the plurality of distance Doppler wind velocity values.

18. The system of claim 10, wherein the processor is configured to estimate a differentiation of the plurality of distance Doppler wind velocity values further includes filtering noise from the plurality of distance Doppler wind velocity values.

\* \* \* \* \*